(12) United States Patent
Shakespeare et al.

(10) Patent No.: US 10,792,203 B2
(45) Date of Patent: Oct. 6, 2020

(54) MECHANICAL MANIPULATOR ARM

(71) Applicant: Aqua Creek Products, LLC, Missoula, MT (US)

(72) Inventors: Scott Shakespeare, Frenchtown, MT (US); Sagar Kumar, Uttar Pradesh (IN); Kyle Roth, Lolo, MT (US); Evan Albert Francis, Missoula, MT (US)

(73) Assignee: Aqua Creek Products LLC, Missoula, MT (US)

( * ) Notice: Subject to any disclaimer, the term of this patent is extended or adjusted under 35 U.S.C. 154(b) by 117 days.

(21) Appl. No.: 16/205,638

(22) Filed: Nov. 30, 2018

(65) Prior Publication Data

US 2020/0170861 A1 Jun. 4, 2020

(51) Int. Cl.
*A61G 7/10* (2006.01)
*F16H 21/44* (2006.01)
*F16H 25/20* (2006.01)

(52) U.S. Cl.
CPC ......... *A61G 7/1005* (2013.01); *A61G 7/1017* (2013.01); *A61G 7/1046* (2013.01); *A61G 7/1051* (2013.01); *A61G 7/1057* (2013.01); *A61G 7/1059* (2013.01); *A61G 7/1074* (2013.01); *F16H 21/44* (2013.01); *A61G 2203/10* (2013.01); *F16H 25/20* (2013.01)

(58) Field of Classification Search
CPC .. A61G 7/1005; A61G 7/1017; A61G 7/1046; A61G 7/1051; A61G 7/1057; A61G 7/1059; A61G 7/1074
See application file for complete search history.

(56) References Cited

U.S. PATENT DOCUMENTS

| | | | |
|---|---|---|---|
| 3,079,021 A * | 2/1963 | Kohorst | E02F 3/407 414/725 |
| 3,275,163 A * | 9/1966 | Schaeff | E02F 3/386 280/766.1 |
| 3,534,832 A * | 10/1970 | Rediske | B66F 11/044 182/13 |
| 4,183,106 A | 1/1980 | Grimes et al. | |
| 4,941,216 A | 7/1990 | Boublil | |
| 5,432,961 A | 7/1995 | Horton | |
| 5,572,921 A | 11/1996 | Krumbeck | |
| 7,249,386 B2 | 7/2007 | Terzo | |
| 2006/0048294 A1 | 3/2006 | Maguire et al. | |
| 2015/0184411 A1 | 7/2015 | Muller | |

* cited by examiner

*Primary Examiner* — J C Jacyna
(74) *Attorney, Agent, or Firm* — Randall Danskin P.S.

(57) ABSTRACT

A manipulator arm for moving a load from a first position at a first elevation, to a second position at a second elevation, provides a base and defines plural spaced apart axle holes. A fulcrum lever link formed of a channel beam defines plural spaced apart axle holes. A first load member, and two support members extend between, and pivotally interconnect, the base plate and the fulcrum lever link and define a quadrilateral lift frame about the pivotal interconnections. An actuator operatively communicates between the first load member and the fulcrum lever link and the fulcrum lever link provides mechanical advantage to the actuator to cause the quadrilateral lift frame to change from a first configuration at the first position to a second configuration at the second position.

18 Claims, 15 Drawing Sheets

MECHANICAL MANIPULATOR ARM

TECHNICAL FIELD

This invention generally relates to mechanical manipulator arms for moving a load from a first position to a second position and from a first elevation to a second elevation. More particularly, this invention relates to a mechanical manipulator arm from moving a human from a first position at a first elevation, to a second position at a second elevation, and even more particularly, for moving a disabled person between a terrestrial surface adjacent a body of water, and an aquatic environment adjacent to the terrestrial surface.

BACKGROUND OF THE INVENTION

Mechanical manipulator arms are known in the art, and are used for a wide variety of purposes including moving loads from one position to another position, for precision placement of objects, and for assembling products, such as, but not limited to automated assembly lines. Other types of manipulator arms may be used to move a load between a terrestrial surface adjacent a body of water, and an aquatic environment adjacent to the terrestrial surface. Such manipulator arms must move the load both vertically and horizontally to accomplish the purpose of providing ingress to, and egress from, the body of water. Commonly, these types of mechanical manipulator arms are called "pool lifts" which are used to move disabled persons between a pool deck and a swimming pool.

Mechanical manipulator arms that are used to move disabled persons between a terrestrial environment and an aquatic environment have a variety of known drawbacks including, but not limited to, complexity, weight, difficulty of use, and specialization, such that a pool lift that is configured to move a chair type support may not be reconfigurable to move other types of supports that may be necessary for moving a disabled person, such as, but not limited to a spine board. Further, many known pool lifts require mounting within a pool volume, below the water surface. Such pool lifts are commonly known as "pedestal" mounts wherein the "pedestal" is permanently mounted within a pool volume, on or adjacent to a bottom surface of the pool which can lead to leaks in the pool and water loss and contamination. Further, known pool lifts are commonly bulky and large and employ plural pairs of lifting members and large hydraulic or electric lifting cylinders or complex gear assemblies.

The instant mechanical manipulator arm is distinguishable from the known pool lifts in providing a lift frame that is comprised of three parallel, and spaced apart lift members, and is further distinguishable because the instant invention uses the mechanical advantage provided by a fulcrum lever link that communicates between the proximate end portions of the spaced apart lift members so as to provide mechanical advantage which allows utilization of a low power and light weight linear actuator.

SUMMARY OF THE INVENTION

A manipulator arm for moving a load from a first position at a first elevation, to a second position at a second elevation, provides a base defining plural spaced apart axle holes. A fulcrum lever link formed of a channel beam defines plural spaced apart axle holes. A first load member, and two support members extend between, and pivotally interconnect, the base plate and the fulcrum lever link and define a three-member quadrilateral lift frame about the pivotal interconnections. An actuator operatively communicating between the first load member and the fulcrum lever link and the fulcrum lever link to provide mechanical advantage to the actuator which causes the quadrilateral lift frame to change from a first configuration at the first position to a second configuration at the second position.

A first aspect of the instant invention is a mechanical manipulator for moving a load from a first position, at a first elevation, to a second position, at a second elevation, comprising a base having a top, a bottom, and defining a base channel between a first side plate and a second side plate, the first side plate and the second side plate are spaced apart from, and parallel to, one another and each side plate defines plural spacedly arrayed axle holes, the base further having a mount for securing the base to a supporting surface, and a drive assembly communicating with a power source, to rotate the base relative to the supporting surface; a lift frame is pivotally interconnected to the base, the lift frame comprising a first load member, two support members, a fulcrum lever link and an actuator, the first load member has a first lower end portion, a second upper end portion, and a length dimension therebetween, and the first lower end portion is pivotally carried within the base channel on an axle journaled by the two base side plates, and the second upper end is pivotally interconnected to the fulcrum lever link with an axle journaled by the fulcrum lever link, and an actuator arm yoke is carried by the first load member proximate to the first lower end portion, and the two support members are parallel, spaced apart, and each has a first end portion, a second end portion and a length dimension therebetween, the first lower end portion of each support member is pivotally interconnected to the base with an axle extending through one of the plural axle holes defined in the base side plate, and the second upper end portion of each support member is pivotally interconnected to the fulcrum lever link with an axle extending through an axle hole defined in the fulcrum lever link, and the fulcrum lever link has a first lower end portion, a second upper end portion, a length dimension therebetween, and defines a U-shaped channel between two spaced apart and parallel side flanges and a transverse wall, and an interior surface within the U-shaped channel, and an exterior surface outside the U-shaped channel, and each side flange of the fulcrum lever link defines plural spacedly arrayed axle holes to journal axles which pivotally interconnect the second upper end portions of the two support members, and pivotally interconnect the second upper end portion of the first load member, a bracket for engagement with a second load member is carried on the exterior facing surface of the transverse wall of the fulcrum lever link proximate the first lower end portion, and the linear actuator has a second end portion interconnected to the fulcrum lever link at a position proximate the second upper end portion and spaced apart from the first load member interconnection and opposite the two support members interconnections, and a first lower end portion pivotally interconnected to the actuator arm yoke so that when actuated, the linear actuator moves between a first retracted position, and a second extended position; and a second load member having a first lower end portion, a second upper end portion and a length dimension therebetween, and the second load member is interconnected with the bracket carried on the exterior surface of the fulcrum lever link, and the first lower end portion of the second load member carries a load support configured for carriage of the load between the first position, at the first elevation, and the second position at the second elevation.

A second aspect of the present invention is a mechanical manipulator further comprising a second linear actuator operatively communicating between the fulcrum lever link and the second load member to axially extend and axially retract the second load member relative to the bracket carried by the fulcrum lever link.

A third aspect of the present invention is a mechanical manipulator further comprising an operator control operatively communicating with the power source and with the drive assembly and with the actuator to cause the drive assembly and/or actuator to actuate responsive to operator input.

A fourth aspect of the present invention is a mechanical manipulator wherein the drive assembly is an electric motor and a gear assembly.

A fifth aspect of the present invention is a mechanical manipulator wherein the actuator is a linear screw actuator.

A sixth aspect of the present invention is a mechanical manipulator wherein the load support is configured to support a human.

A seventh aspect of the present invention is a mechanical manipulator wherein the load is a human.

An eighth aspect of the present invention is a mechanical manipulator wherein the base attaches to a movable carriage.

A ninth aspect of the present invention is a mechanical manipulator wherein the spaced orientation of the plural spacedly arrayed axle holes defined in first and second base side plates determines an arc of travel of the lift frame relative to vertical.

A tenth aspect of the present invention is a mechanical manipulator wherein the arc of travel of the lift frame relative to horizontal, extends vertically below horizontal.

An eleventh aspect of the present invention is a mechanical manipulator wherein the fulcrum lever link bracket defines a channel having an axis, and the axis of the bracket channel is parallel to an axis of the fulcrum lever link channel.

A twelfth aspect of the present invention is a mechanical manipulator wherein the fulcrum lever link bracket defines a channel having an axis, and the axis of the fulcrum lever link bracket channel is not parallel to an axis of the fulcrum lever link channel.

A thirteenth aspect of the present invention is a pool lift for moving a load from a first position, at a first elevation, to a second position, at a second elevation, comprising a base having a top portion, a bottom portion, a front portion and a rear portion and defining a base channel between a first, generally planar, vertically oriented side plate and a second, generally planar, vertically oriented side plate, the first side plate and the second side plate are spaced apart from and parallel to one another and each side plate has an exterior facing surface and an opposing inner facing surface and each side plate defines plural spacedly arrayed axle holes to journal axles therein, a strengthening bottom brace and a strengthening rear brace structurally interconnect the first side plate and the second side plate at the inner facing surface of the bottom portion and the inner facing surface of the rear portion, a strengthening gusset structurally carried on the exterior facing surface of each side plate, a mount carried on the bottom portion of the base, is for positionally securing the base to a supporting surface, and a drive assembly carried by the base, and communicating with a power source rotates the base, about a vertical axis, relative to the supporting surface responsive to an operator input; a lift frame having a first lower end portion pivotally interconnected with the base, and a second upper end portion pivotally interconnected with a fulcrum lever link, the lift frame comprising a first load member, two support members, the fulcrum lever link and an actuator, the first load member has a first lower end portion defining a transversely extending axle hole, a second upper end portion defining a transversely extending axle hole, and a length dimension between the first lower end portion and the second upper end portion, a first exterior surface, a second exterior surface, and two opposing side surfaces, and the first lower end portion of the first load member is pivotally carried within the base channel on an axle extending through the transversely extending axle hole and journaled by the two base side plates so that the first load member is pivotally movable relative to the base, and the second upper end portion of the first load member is pivotally interconnected to the fulcrum lever link by means of an axle extending through the transversely extending axle hole and journaled by the fulcrum lever link, and an actuator arm yoke carried on the second exterior surface of the first load member and proximate to the first lower end portion, and the two parallel, spaced apart, support members are each elongate and each have a first lower end portion defining a transversely extending axle hole and a second upper end portion defining a transversely extending axle hole with a length dimension therebetween, each of the two support members further has a laterally inner side portion and an opposing laterally outer side portion, the first lower end portion of each of the two support members is pivotally interconnected to the base with an axle extending through the transversely extending axle hole defined therein and extending through one of the plural spacedly arrayed axle holes defined in the base side plate, and the second upper end portion of each of the two support members is pivotally interconnected to the fulcrum lever link with an axle extending through the transversely extending axle hole defined therein, and extending through one of plural axle holes defined in a fulcrum lever link side flange, and the laterally inner side portion of each of the two support members, at the first lower end portion, is adjacent the exterior facing surface of a base side plate, and at the second upper end portion thereof, is adjacent an exterior facing surface of the fulcrum lever link side flange, and the fulcrum lever link has a first end portion, a second end portion with a length dimension therebetween, and defines an inverted U-shaped channel between two spaced apart parallel side flanges and a transverse wall, the transverse wall, and each side flange having an interior surface within the inverted U-shaped channel, and an exterior surface outside the U-shaped channel, and each side flange defines plural spacedly arrayed axle holes, to journal axles which pivotally interconnect the second upper end portions of each of the two support members to the exterior facing surfaces of the side flanges of the fulcrum lever link, and to pivotally interconnect the second upper end portion of the first load member to the fulcrum lever link within the inverted U-shaped channel, a fulcrum lever link bracket is carried on the exterior facing surface of the transverse wall proximate the first end portion of the fulcrum lever link for engagement with a second load member, and a linear screw actuator having a second end portion interconnected to the second end of the fulcrum lever link within the inverted U-shaped channel with an axle, and spaced apart from the first load member interconnection and opposite the two support member interconnections, and a first lower end portion pivotally interconnected to the actuator arm yoke carried by the first load member, the linear screw actuator further having a motor, communicating with the power source, and a gear assembly so that, when actuated by an operator input, the motor rotates a linear screw shaft causing the actuator to axially move between a first retracted position and a second extended position; and the second load member has a first lower end portion and a second upper end portion with a length dimension between the first lower end portion and the second upper end portion, the second load member interconnected with the fulcrum lever link bracket carried on the exterior surface of the fulcrum lever link, and the first lower end portion of the second load member carries a load support configured for carriage of a load, and responsive to operator actuation of the actuator, and the base drive assembly, the load support is movable, while carrying the load, between the first position, at the first elevation on a swimming pool deck, and the second position at the second elevation within a body of water within a swimming pool volume.

A fourteenth aspect of the present invention is a manipulator arm for moving a load between a first position at a first elevation to a second position at a second elevation comprising a base plate having a mount to engage with a supporting surface, and the base plate defines two spaced apart axle holes; a fulcrum lever link having a transverse wall and two spaced apart and parallel side flanges, each side flange structurally interconnected to the transverse wall along adjacent edge portions thereof, the fulcrum lever link having a first end portion, a second and portion and defining two spaced apart axle holes in each side flange; an elongate first load member having a first end portion and a spaced apart second and portion, each end portion of the first load member defining a transversely extending axle hole to carry an axle extending therethrough; an elongate support member having a first end portion and a spaced apart second end portion, each end portion of the elongate support member defining a transversely extending axle hole to carry an axle extending therethrough; two of the plural spacedly arrayed axle holes defined in the base side plate, and two of the spacedly arrayed holes defined in the side flange of the fulcrum lever link define four pivot points for a quadrilateral formed by the first load member and the elongate support member and the fulcrum lever link and the base side plate, and the quadrilateral has a first configuration in the first position and has a second configuration in the second position, and changing the quadrilateral configuration from the first configuration to the second configuration is accomplished by exerting a force on the fulcrum lever link second end portion that is spaced apart from the two spacedly arrayed holes defined in the side flange.

DETAILED DESCRIPTION OF THE PREFERRED EMBODIMENTS

Figure 1:
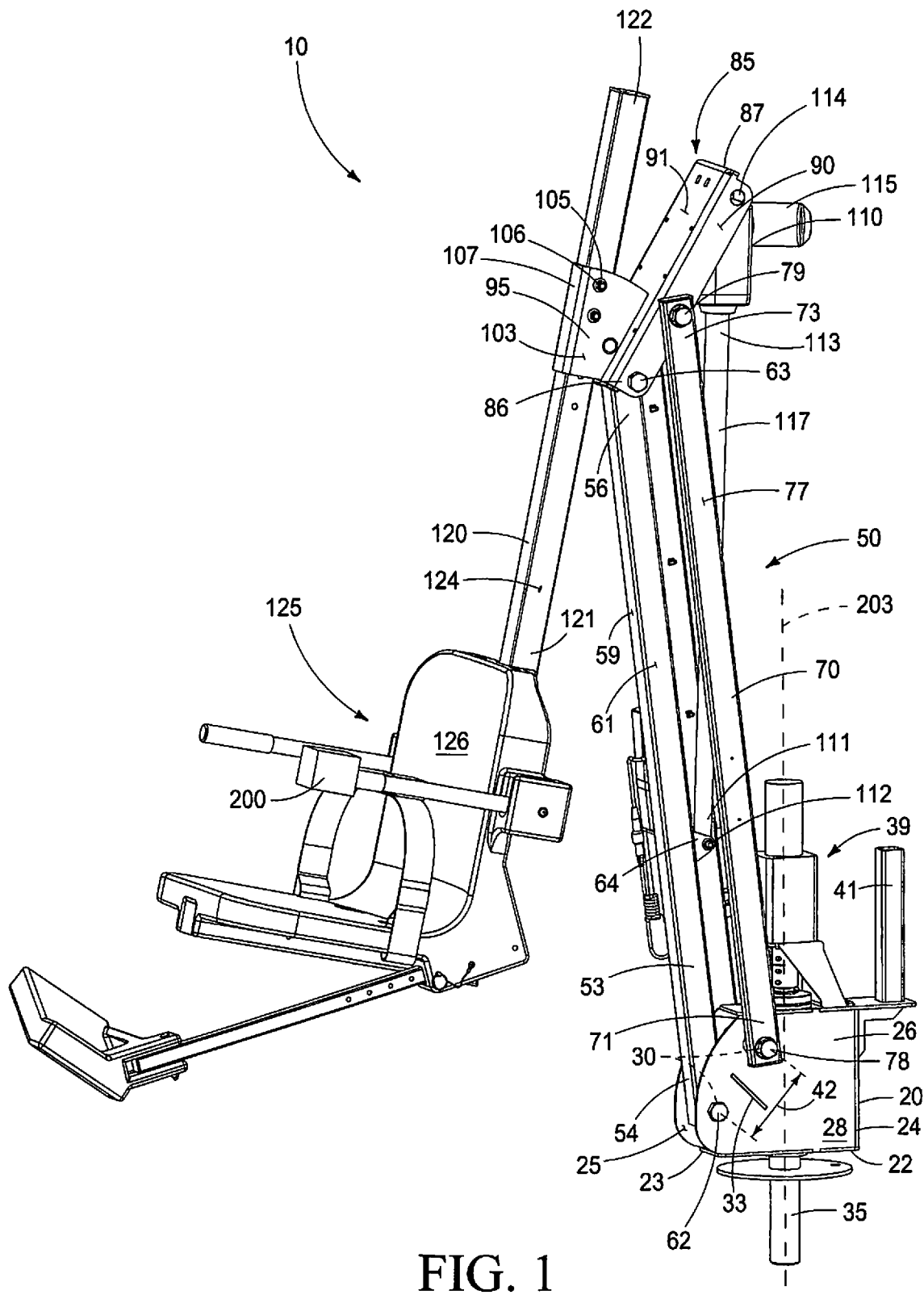
FIG. 1 is an isometric front, first side, and top view of the mechanical manipulator arm having a load support configured as a chair, and in a first position and at a first elevation.

This disclosure of the invention is submitted in furtherance of the constitutional purposes of the U.S. Patent Laws "to promote the progress of science and useful arts" (Article 1, Section 8).

A mechanical manipulator arm lift 10 generally provides a base 20, a lift frame 50, and a load support 125.

The base 20 is interconnected to a supporting surface 11 so as to provide support for the lift 10. The supporting surface 11 may be a horizontal surface, such as, but not limited to the deck 16 of a swimming pool 17 (FIG. 11), or a floor, or even a ceiling. Further, the supporting surface 11 may be other than horizontal surface, such as a vertical surface including a wall (FIG. 6), or even a movable surface, such as a movable carriage 36 (FIG. 5) or vehicle (not shown). The aforementioned specific examples are examples only, and the instant invention is not limited thereto.

The base 20 has a generally horizontal and planar bottom portion 22 that has a top surface 22A, an opposing bottom surface 22B, a front portion 23 and a rear portion 24. The generally planar top surface 22A of the base 20, structurally carries a vertically extending first side plate 26 and a parallel spaced apart and vertically extending second side plate 27. The first side plate 26 and the second side plate 27 each have an exterior facing surface 28 and an opposing interior facing surface 29, and each defines plural spacedly arrayed axle holes 30 therein that are a predetermined distance 42 and angle spaced apart from one another. The two spaced apart interior facing surfaces 29 of the two side plates 26, 27 define a base channel 25 therebetween. A strengthening bottom brace (not shown), a strengthening rear brace 32 and a gusset 33 may be interconnected to the side plates 26, 27 to provide additional strength and rigidity thereto. A cylindrical mount 35 extends generally vertically downwardly from the bottom surface 22B of the base 20 and provides an interconnection with the supporting surface 11, such as a pool deck 16.

The lift frame 50 is pivotally interconnected with the base 20 and has a first load member 53, two support members 70, a fulcrum lever link 85 and an actuator 110.

The first load member 53 has a first lower end portion 54 and a second upper end portion 56 with a length dimension 58 therebetween. A transversely extending axle hole (not shown) is defined in the first lower end portion 54 for carriage of an axle 62 so as to pivotally interconnect the first load member 53 at the first lower end portion 54 to the base 20 side plates 26, 27. The axle 62 extends through a pair of aligned spacedly arrayed axle holes 30 defined in the first and second side plates 26, 27 of the base 20, and proximate the front portion 23, and through the transversely extending axle hole (not shown) defined in the first lower end portion 54 so that the first lower end portion 54 of the first load member 53 is pivotally carried within the base channel 25 defined by the base 20. A similar transversely extending axle hole 57 is defined in the second upper end portion 56 of the first load member 53 for carriage of an axle 63 therein. In the embodiments shown in the Figures, the first load member 53 is an elongate box beam having a first exterior surface 59 oriented toward the front portion 23 of the base 20, a second opposing exterior surface 60, and two exterior side surfaces 61. An actuator arm yoke 64 is structurally carried on the second exterior surface 60 of the first load member 53 proximate to, but spaced apart from, the first lower end portion 54.

The two support members 70 each have a first lower end portion 71 and a second upper end portion 73 with a length dimension 75 therebetween. A transversely extending axle hole 72 is defined in the first lower end portion 71 of each support member 70, and a similar transversely extending axle hole 74 is defined in the second upper end portion 73 of each support member 70. Each support member 70 has a laterally inner side portion 76 and an opposing laterally outer side portion 77. An axle 78 extends through the transversely extending axle hole 72 defined in the first lower end portion 71 and also extends through one of the spacedly arrayed holes 30 defined in each side plate 26, 27 of the base 20 so as to pivotally interconnect each support member 70 to the base 20. The laterally inner side portion 76 of each support member 70 is immediately adjacent the exterior facing surface 28 of the adjacent side plate 26, 27 so that the elongate support members 70 are not carried within the medial channel 25 of the base 20.

The fulcrum lever link 85 has a first end portion 86 and a second end portion 87 with a length dimension 88 therebetween. The fulcrum lever link 85 is a channel beam defining a "U" shaped channel 89 with strengthening gussets 101 (FIG. 4) between the first end portion 86 and the second end portion 87. The fulcrum lever link 85 further defines a longitudinal axis 98. The fulcrum lever link 85 has two spaced apart parallel side flanges 90 and a transverse wall 91 that extends between, and structurally interconnects, the two spaced apart parallel side flanges 90. The fulcrum lever link 85 further has an interior surface 92 inside the U-shaped channel 89 and an exterior surface 93 opposite the interior surface 92. Plural spacedly arrayed axle holes 94 are defined in each of the side flanges 90 so as to journal axle 63 to pivotally connect the first load member 53 to the fulcrum lever link 85, and so as to journal axles 79 so as to pivotally interconnect the two support members 70 to the fulcrum lever link 85. As shown in the drawings, the second upper end portion 56 of the first load member 53 is positioned within the U-shaped channel 89 defined by the fulcrum lever link 85, between the two spaced apart parallel side flanges 90 and proximate the first end portion 86 of the fulcrum lever link 85. The second upper end portions 73 of each of the support members 70 are pivotally interconnected to the fulcrum lever link 85, with axles 79, at a position generally medially between the first end portion 86 and the second end portion 87. The laterally inner side portion 76 of each support member 70 is positioned immediately adjacent the exterior facing surface 93 of each side flange 90. In the preferred embodiment, the distance 102 (FIG. 2) between axle 79 and axle 63 is between four (4") inches and seven (7") inches and is more preferably about five and one half (5.5") inches. Length dimension 109 (FIG. 3) between axle 114 of the actuator 110 and axle 79 of the support member 70 provides a lever arm to facilitate and ease movement of the lift frame 50 by the actuator 110. Increasing and/or decreasing distance 109 provides additional and/or less mechanical advantage to the actuator 110 to allow movement of larger/heavier loads.

Figure 4:
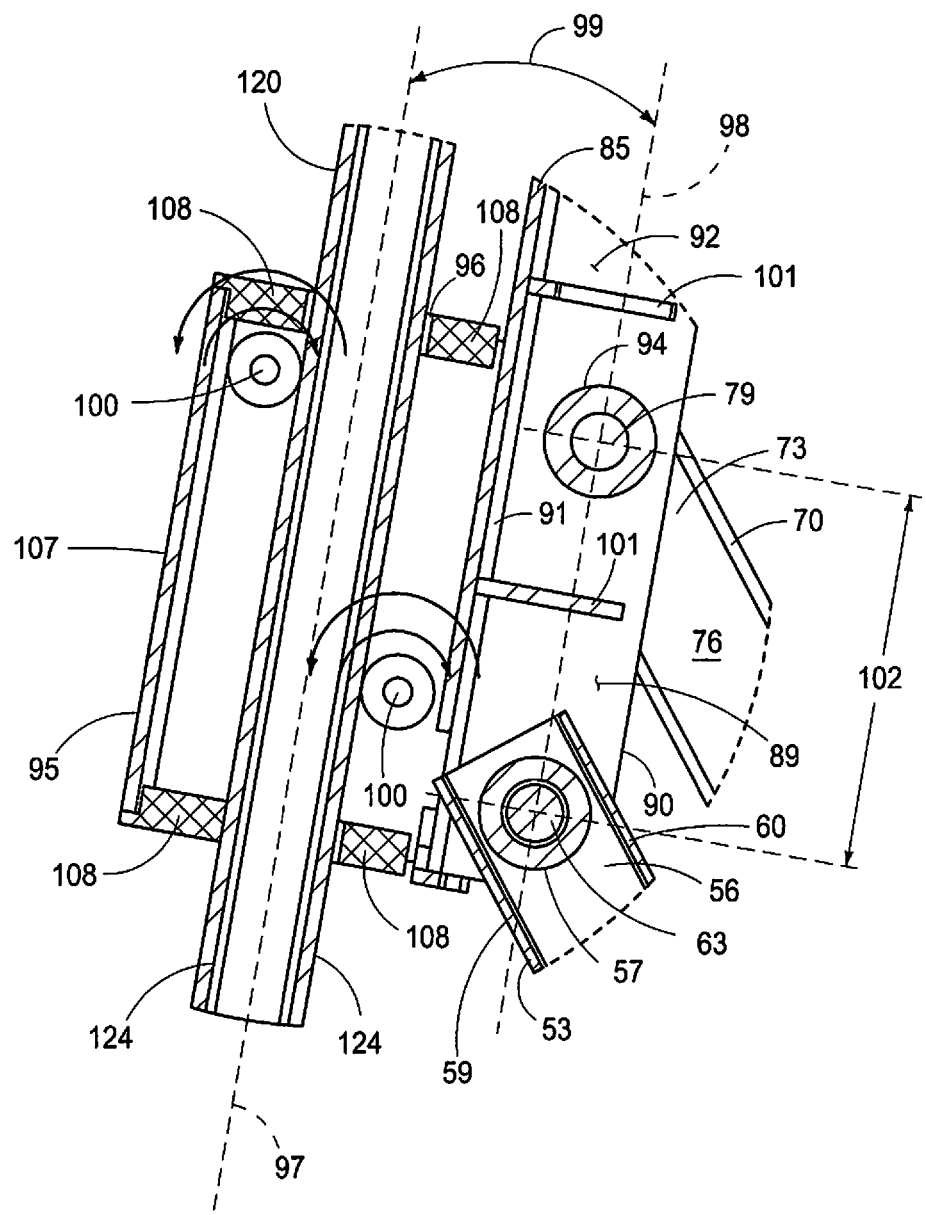
FIG. 4 is an enlarged orthographic, partial cutaway cross-sectional view of the interconnection of the second lift member with the fulcrum lever link bracket of FIG. 3 showing the internal roller bearings and slide bushings to facilitate axial movement of the second load member relative to the fulcrum lever link bracket.

A fulcrum lever link bracket 95 is structurally carried on the exterior facing surface 93 of the fulcrum lever link 85 proximate the first end portion 86 thereof. The bracket 95 has a first side portion 103 and a parallel and spaced apart second side portion (not shown). Plural spacedly arrayed holes 105 are defined in the first side portion 103 and the second side portion to carry fasteners 106 extending therethrough. A transverse wall 107 extends between, and structurally communicates with edge portions of the first side portion 103 and second side portion (not shown) opposite the exterior surface 93 of the transverse wall 91 of the fulcrum lever link 85. The bracket 95 defines a medial channel 96 extending therethrough between the two spaced apart side portions and between an inner surface 92 of the transverse wall 107 and the exterior surface 93 of the transverse wall 91 of the fulcrum lever link 85. The medial channel 96 further defines a longitudinal axis 97. An angle 99 is defined between the axis 97 of the medial channel 96 of the bracket 95, and the axis 98 of the fulcrum lever link 85. (FIG. 4).

Figure 2:
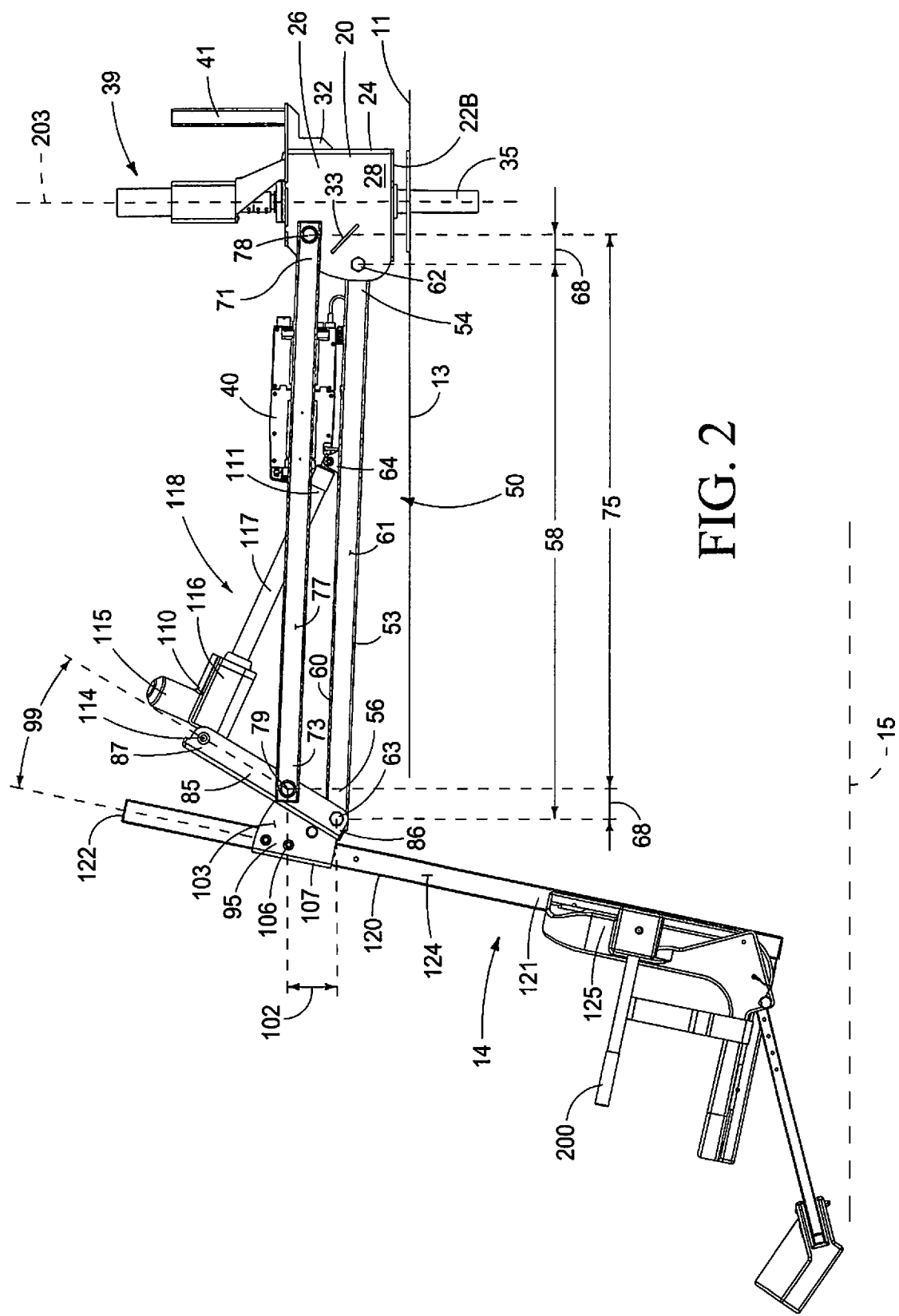
FIG. 2 is an orthographic first side view of the manipulator arm of FIG. 1 in a second position and at a second elevation.
Figure 13:
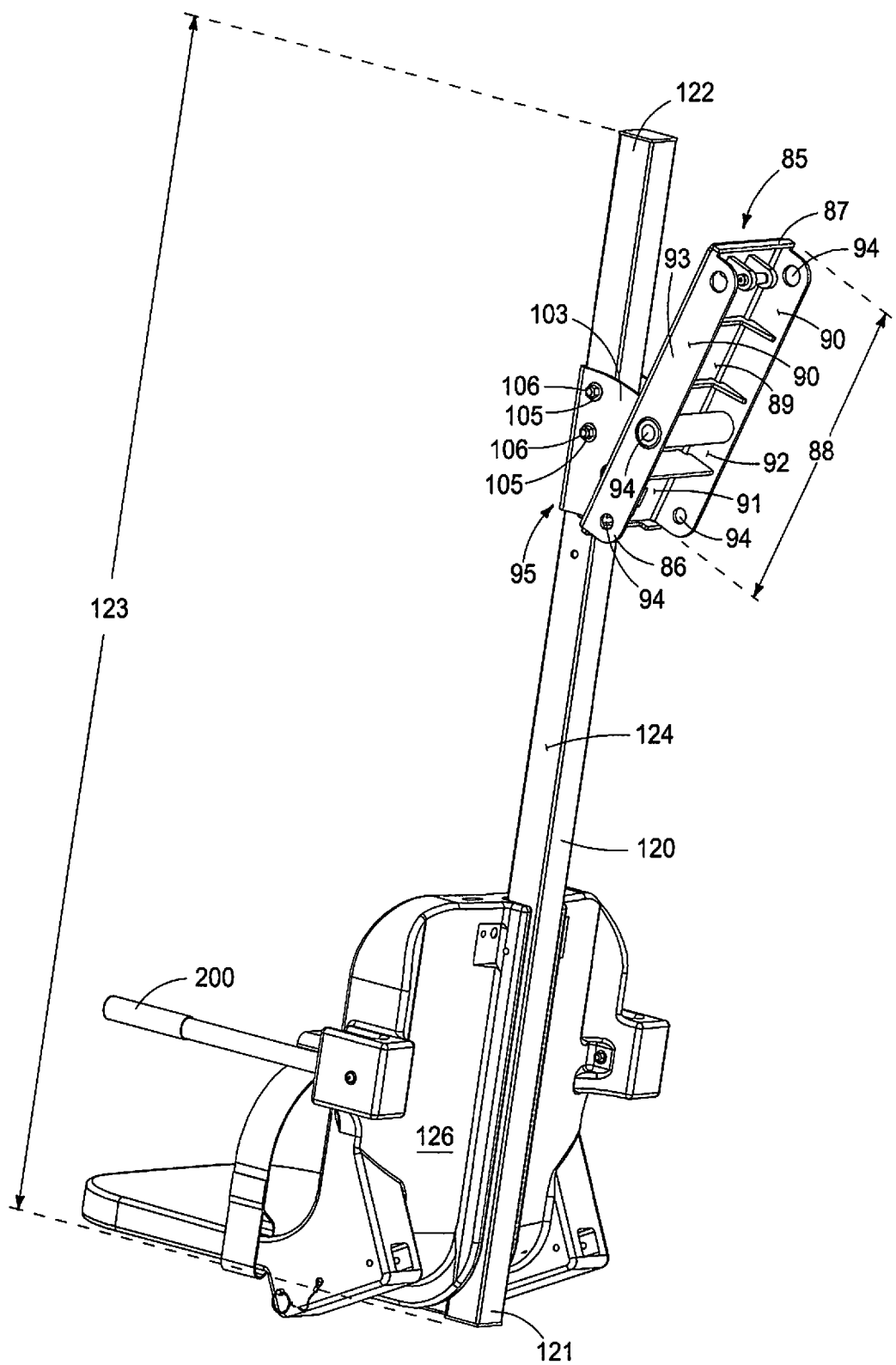
FIG. 13 is an isometric back, first side, and top view of the second load member, the load support, the fulcrum lever link and the fulcrum lever link bracket of FIG. 1.
Figure 14:
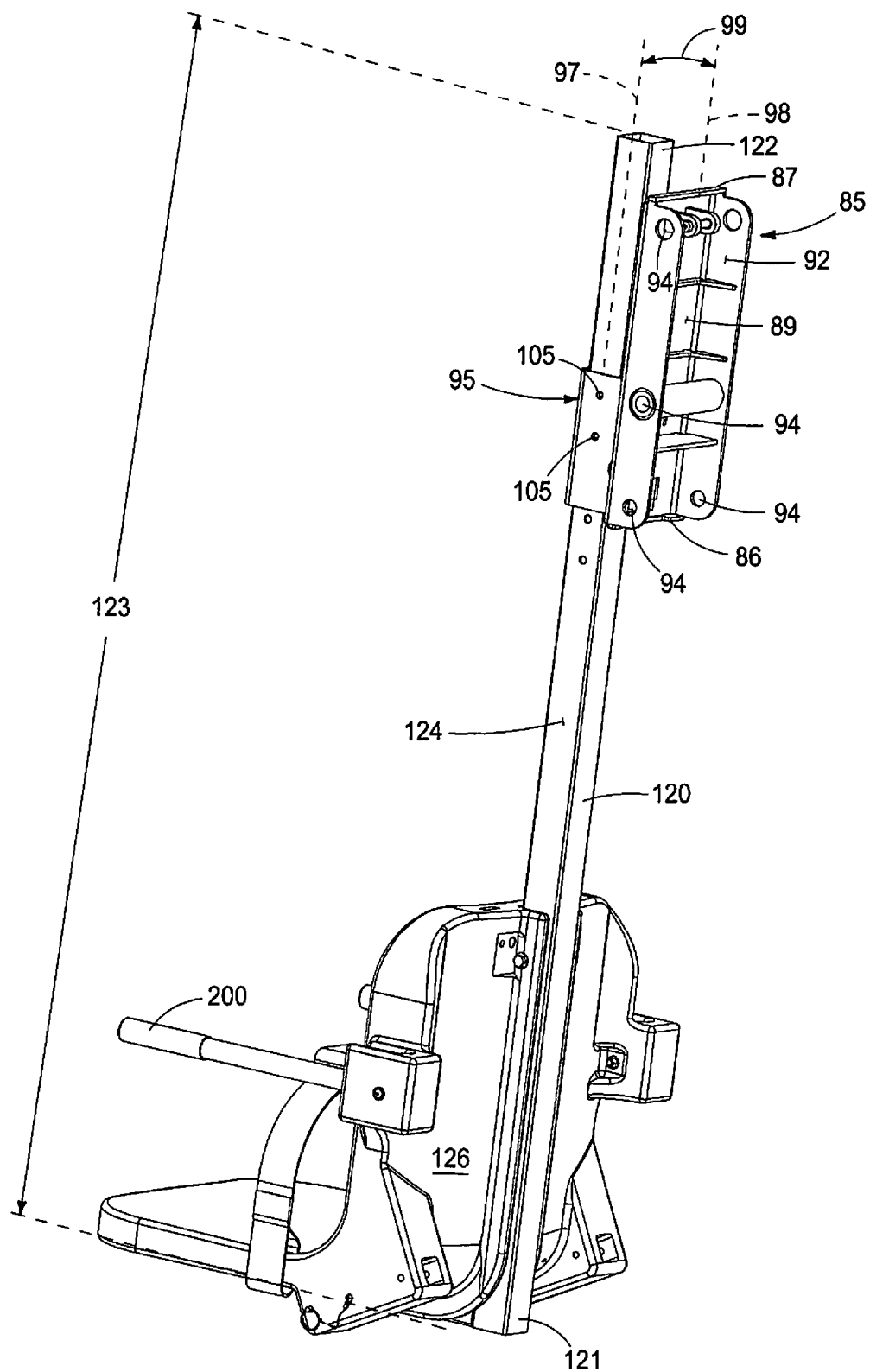
FIG. 14 is an isometric back, first side, and top view of the second load member, the load support, the fulcrum lever link and an alternative configuration of the fulcrum lever link bracket.

FIGS. 1, 2 and 13 show a first embodiment of the fulcrum lever link bracket 95 which is fixedly secured to the exterior surface 93 of the fulcrum lever link 85 proximate the first end portion 86 thereof. In the first embodiment, the angle 99 is fixed at a predetermined angle relative to the fulcrum lever link axis 98 to provide a predetermined amount of travel/reach/depth of the lift 10 and for fixed positional engagement with a second load member 120. Angle 99 may be altered as desired during manufacture of the bracket 95 by altering the configuration of the two spaced apart side portions 103, 104.

FIGS. 3, 4, 5 and 15 show a second possible embodiment of the bracket 95 which has a different angle 99 (in this case parallel) between the axis 97 of the medial channel 96 of the bracket 95, and the axis 98 of the fulcrum lever link 85, and is configured to provide a different amount of length/distance/depth of reach for the lift 10. As noted previously, angle 99 may be altered/adjusted depending upon the intended use and desired length/distance/depth of reach of the lift 10, and in a still further possible embodiment, the angle 99 may be automatically or manually adjustable using angular movement means that are well known in the art, and is therefore not shown herein.

Depending upon the desired length/distance/depth of reach of the lift 10 (as measured between the first position 12 (R1) and the second position 14(R2)) (FIG. 12) the axes 97, 98 may be parallel (FIG. 3, FIG. 15), or may be other than parallel 99 (FIG. 1, FIG. 2 FIG. 13).

As shown in FIG. 4, in the second possible embodiment, plural guide rollers 100 and plural slide bushings 108 are carried by the fulcrum lever link bracket 95 to facilitate axial movement of a second load member 120 relative to the bracket 95. Such axial movement increases/decreases the length/depth of possible movement of the supported load (not shown) relative to the first position 12 at the first elevation 13.

Actuator 110 has a first lower end portion 111 and a second upper end portion 113 and communicates between the actuator arm yoke 64 carried on the first load member 53, and fulcrum lever link 85 proximate the second end portion 87 thereof. The actuator 110 is preferably an electrically powered linear screw apparatus having a motor 115, an interconnected gear assembly 116 and a linear screw shaft 117 which are all operatively interconnected so that actuation of the motor 115 operates the gear assembly 116 which causes the linear screw shaft 117 to rotate axially. Axial rotation of the linear screw shaft 117 causes the actuator 110 to move between a first retracted position 118 (FIGS. 2, 3) and a second extended position 119 (FIGS. 1, 5, 7, 8, 9, 10). The first lower end portion 111 of the actuator 110 is pivotally interconnected to the actuator arm yoke 64 by means of an axle 112 that is journaled by the yoke 64. The second upper end portion 113 of the actuator 110 is pivotally interconnected to the fulcrum lever link 85 by axle 114 proximate the second end portion 87 thereof. The second upper end portion 113 of the actuator 110 is carried within the U-shaped channel 89 defined by the fulcrum lever link 85 and is pivotally attached thereto by axle 114 that is journaled by the spaced apart side flanges 90. The length dimension 109 of the fulcrum lever link 85 between axle 114 and axle 79 provides mechanical advantage to the lift frame 50 and allows a moderately sized actuator 110 to move a large/heavy load (not shown) with the lift frame 50. The greater length dimension 109 is, the greater mechanical advantage is provided to the actuator 110. Similarly, the smaller the distance 109, the less mechanical advantages provided. It is also contemplated, that hydraulic cylinders (not shown) utilizing hydraulic pressure generated by a motor (not shown) driving a hydraulic pump (not shown) fluidically communicating with a fluid reservoir (not shown) may likewise be used as the actuator 110.

The second load member 120 is preferably an elongate box beam and has a first lower end portion 121 and a second upper end portion 122 with a length dimension 123 therebetween, and has an exterior surface 124 with dimensions (not shown) between the opposing exterior surfaces 124 that operatively cooperate with the medial channel 96 defined by the fulcrum lever link bracket 95 carried by the fulcrum lever link 85. The operative cooperation between the exterior surfaces 124 of the second load member 120 and the medial channel 96 defined by the bracket 95 allows for a secure and stable interconnection therebetween by use of fasteners 106 extending through the holes 105 defined in the sides 103, 104 of the bracket 95 and aligned with the holes 106 defined in the second load member 120.

As shown in FIG. 4, the exterior surfaces 124 of the second load member 120 may also communicate with plural guide rollers 100 and slide bushings 108 carried within the medial channel 96 to facilitate axial movement of the second load member 120 relative to the bracket 95 and relative to the fulcrum lever link 85.

Figure 3:
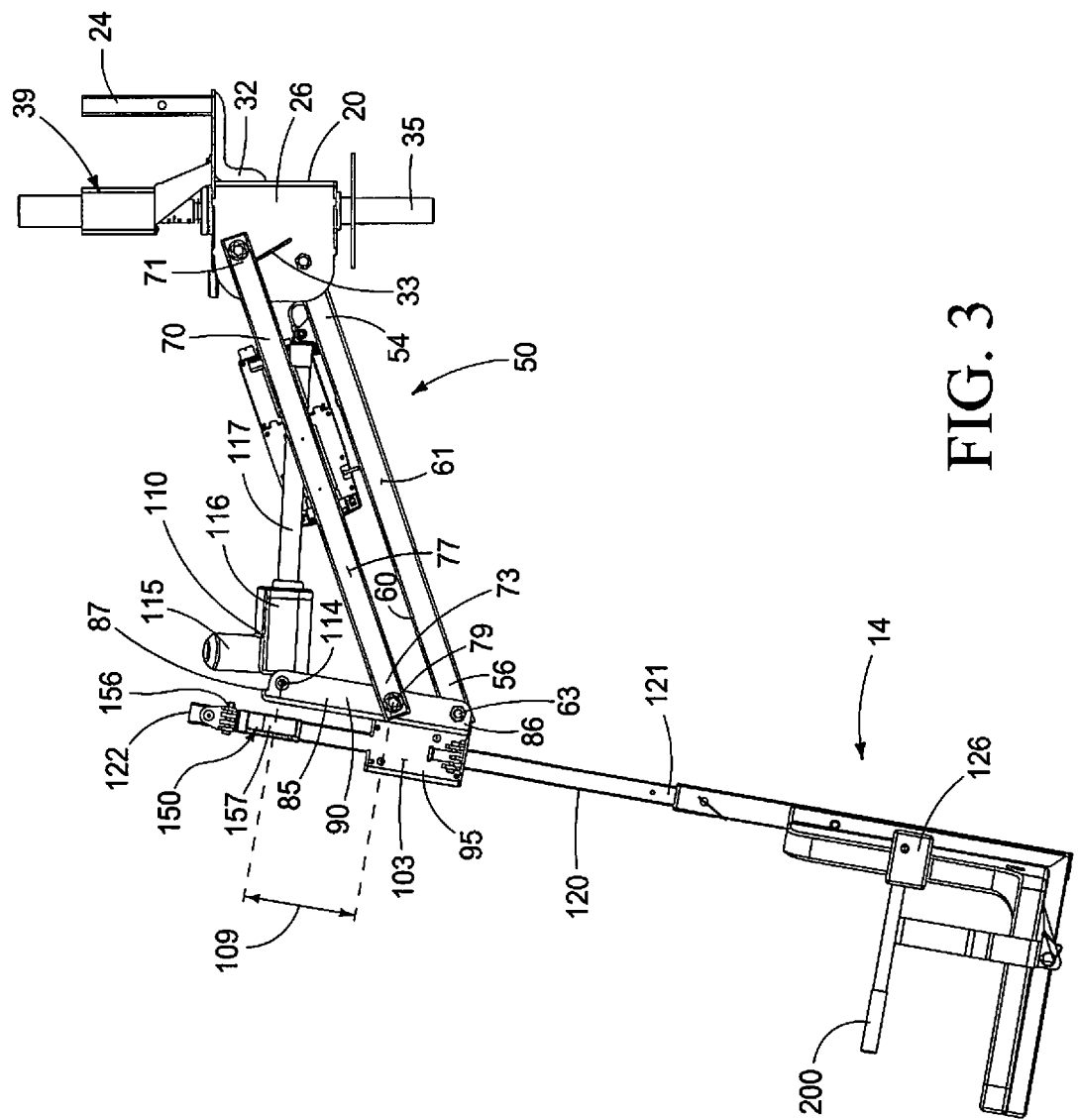
FIG. 3 is an orthographic first side view of a second configuration of the manipulator arm in the second position and at the second elevation.
Figure 5:
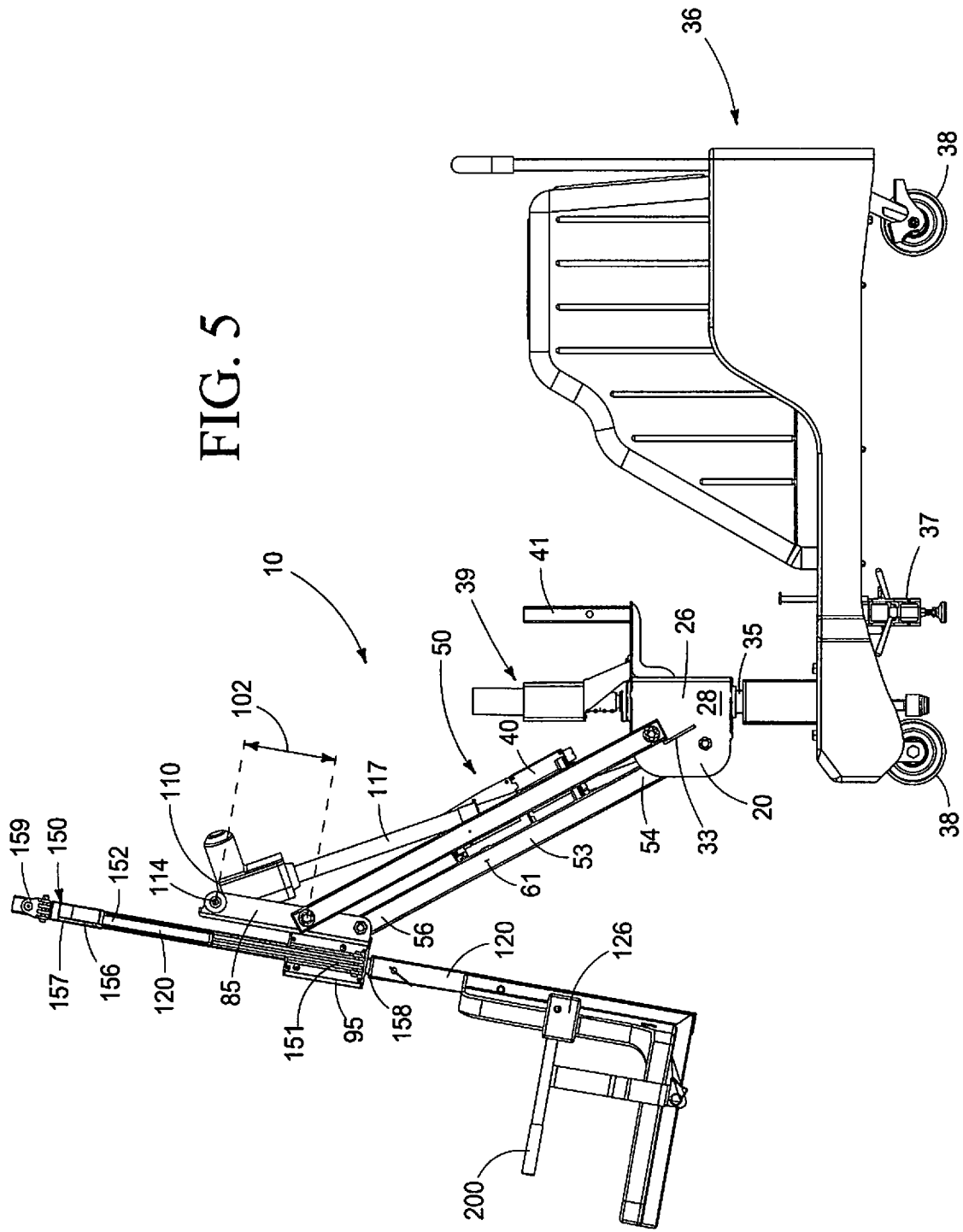
FIG. 5 is an orthographic first side view of the manipulator arm lift supported on a movable carriage.
Figure 6:
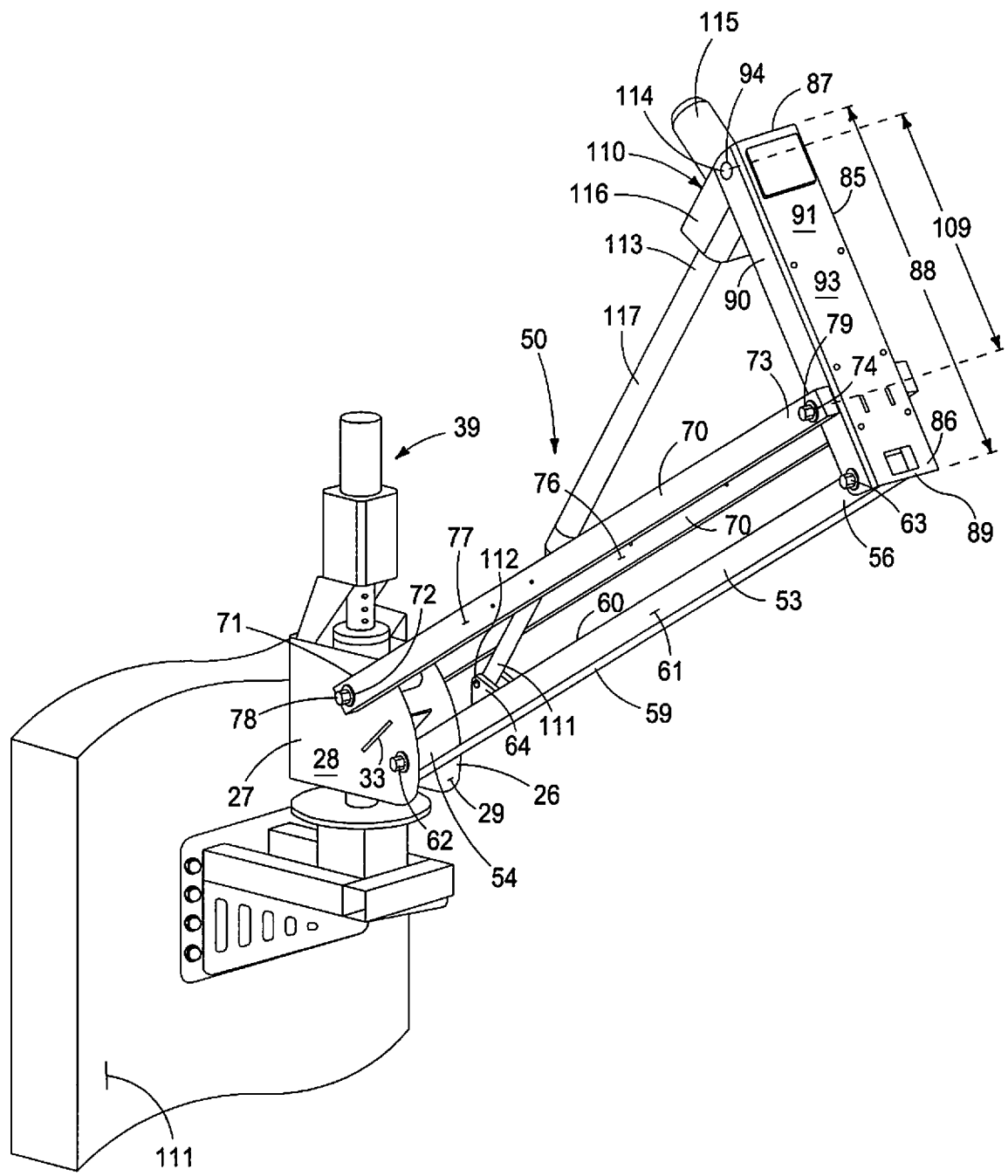
FIG. 6 is an isometric second side, front, and top view of the manipulator arm lift, less the second load member and at a medial position between the first position and the second position and mounted to a vertical supporting surface.
Figure 15:
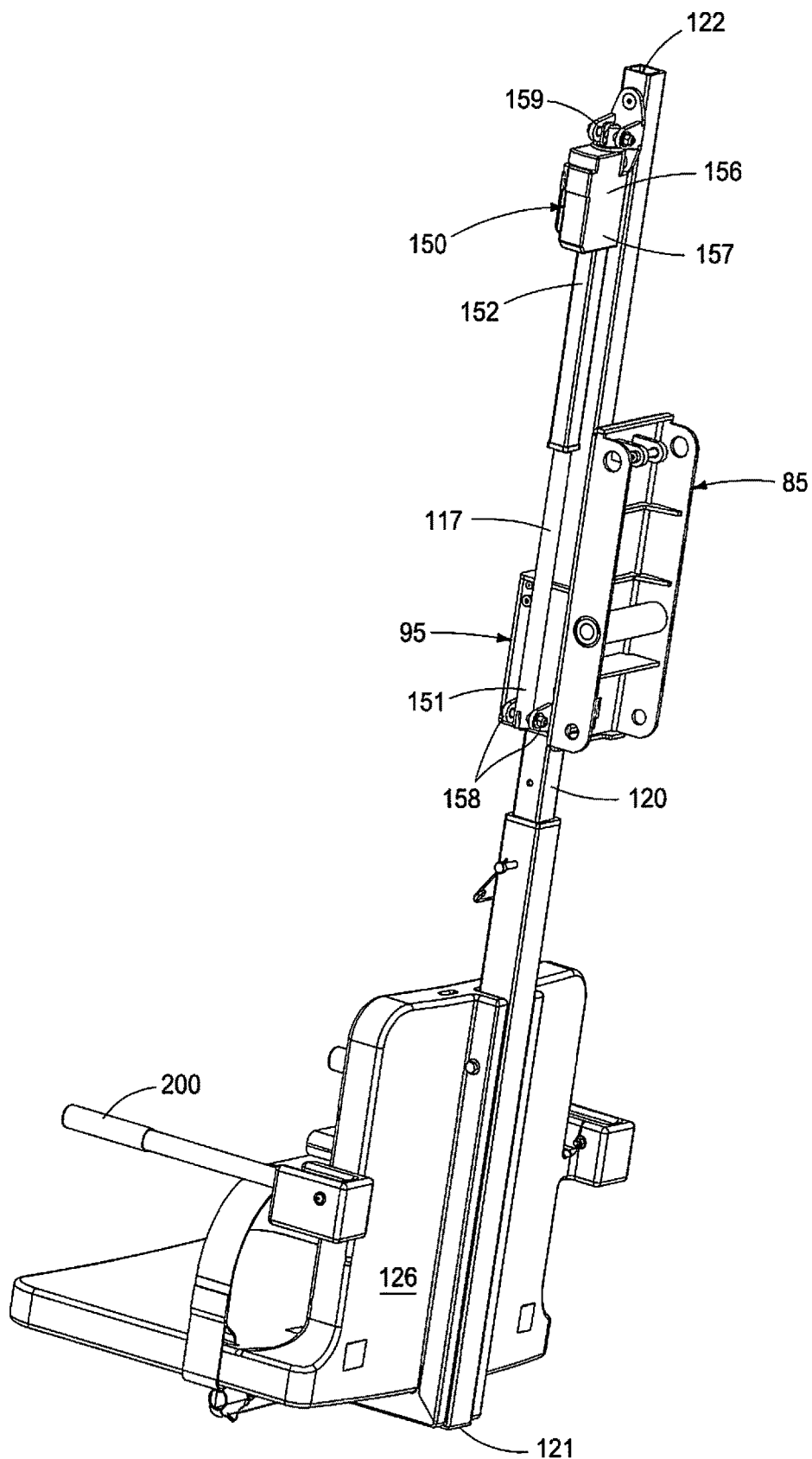
FIG. 15 is an isometric back, first side, and top view of the second load member, the load support, and the fulcrum lever link with a second linear actuator communicating between the fulcrum lever link and the second load member to provide axial linear motion to the second load member relative to the fulcrum lever link bracket.

In a further embodiment, as shown in FIGS. 3, 5 and 15, a second linear actuator 150 may communicate between a fulcrum lever link attachment yoke 158 carried by the fulcrum lever link bracket 95 and a second load member attachment yoke 159 carried at the second end portion 122 of the second load member 120. The structure and configuration of the second linear actuator 150 is similar to that of the first linear actuator 110, so a detailed description thereof is not provided here. The interconnection of the second linear actuator 150 to the yoke 158 provides a reference point relative to which the first end portion 121 of the second load member 120 moves. Actuation of motor 156 operates the interconnected gear assembly 157 and causes linear screw shaft 117 to rotate. Rotation of the linear screw shaft 117 causes the second linear actuator 150 to move between a first position (FIG. 5) and a second position (FIG. 3). Because the second load member 120 is axially movable relative to the bracket 95 through the medial channel 96, and along the axis 97 thereof, extension and retraction of the linear screw shaft 117 causes the second load member 120 to axially move between the first position (FIG. 5) and the second position (FIG. 3). The second linear actuator 150 may be operated separately, or simultaneously with the first linear actuator 110 by means of an operator using the operator control 200. The operator control 200 may be incorporated into the load support 125 (such as in, but not limited to, an arm portion of the chair 126) so as to be an accessible by a user, or the operator control 200 may be remote from the load support 125 so as to be operated by an assistant, or person other than the user. The operator control 200 may be wired, or may be wireless.

Figure 7:
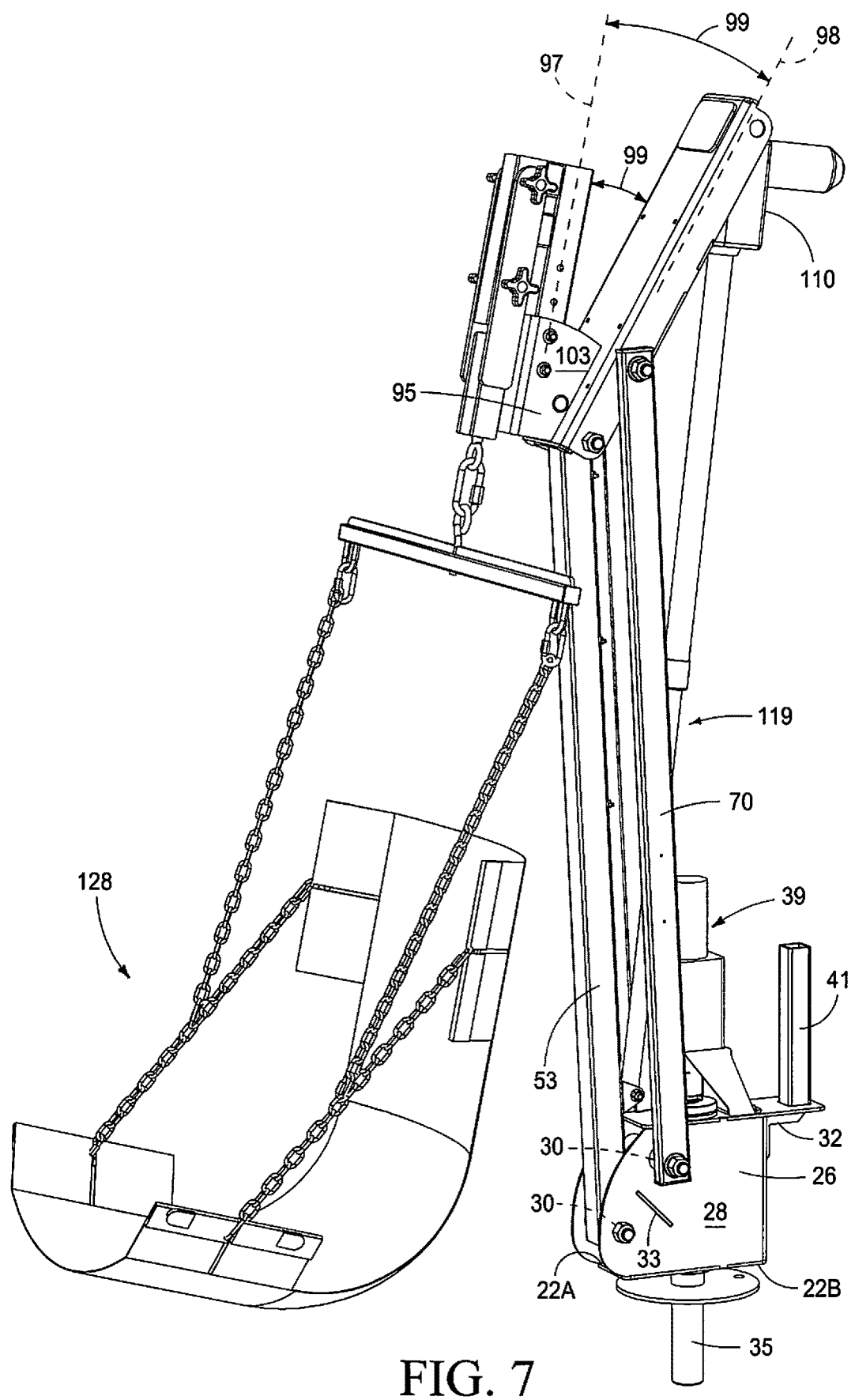
FIG. 7 is an isometric first side, front, and top view of the manipulator arm lift having a load support configured as a sling.
Figure 8:
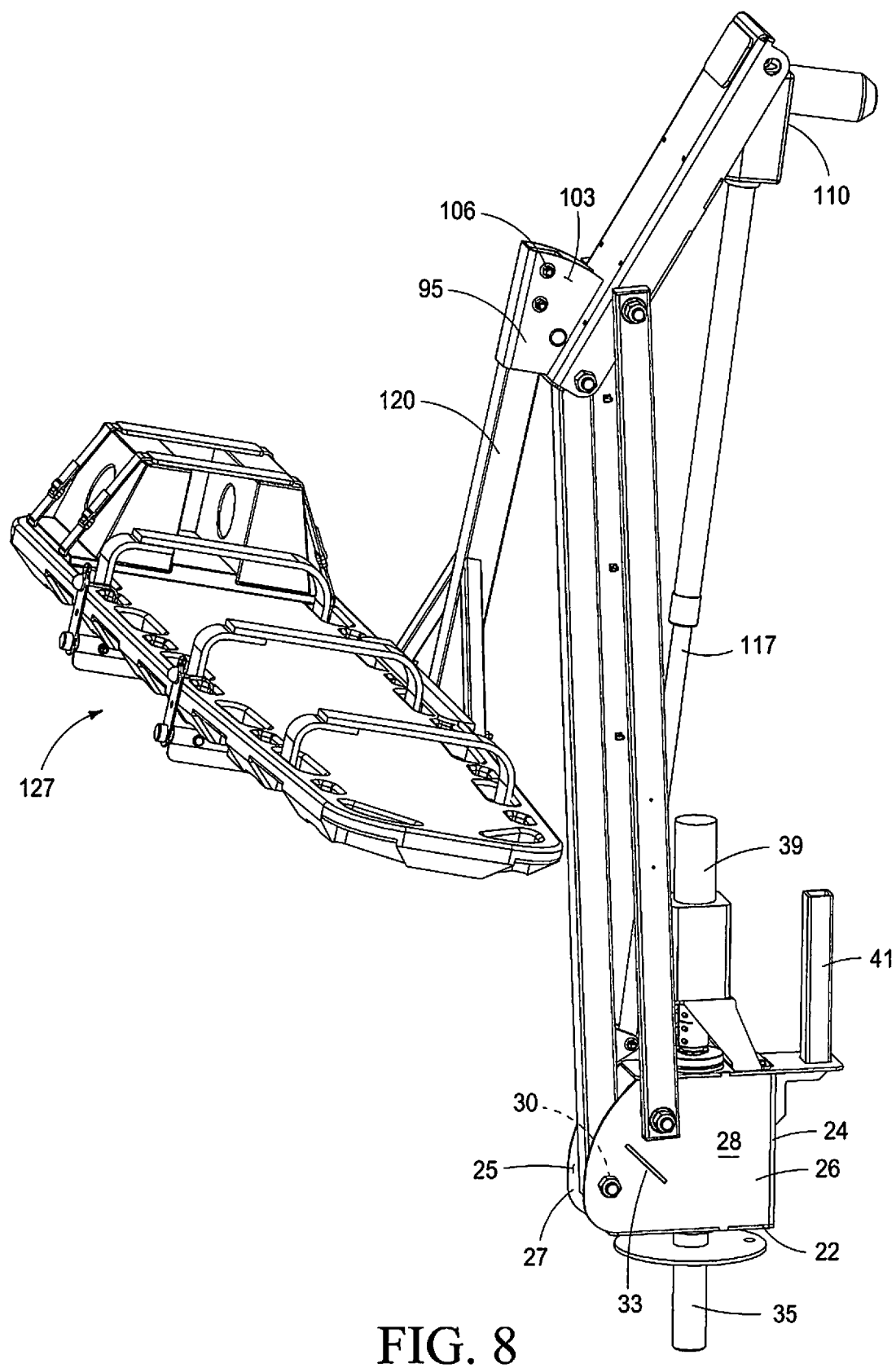
FIG. 8 is an isometric first side, front, and top view of the manipulator arm lift having a load support configured as a stretcher/backboard/spine support.
Figure 9:
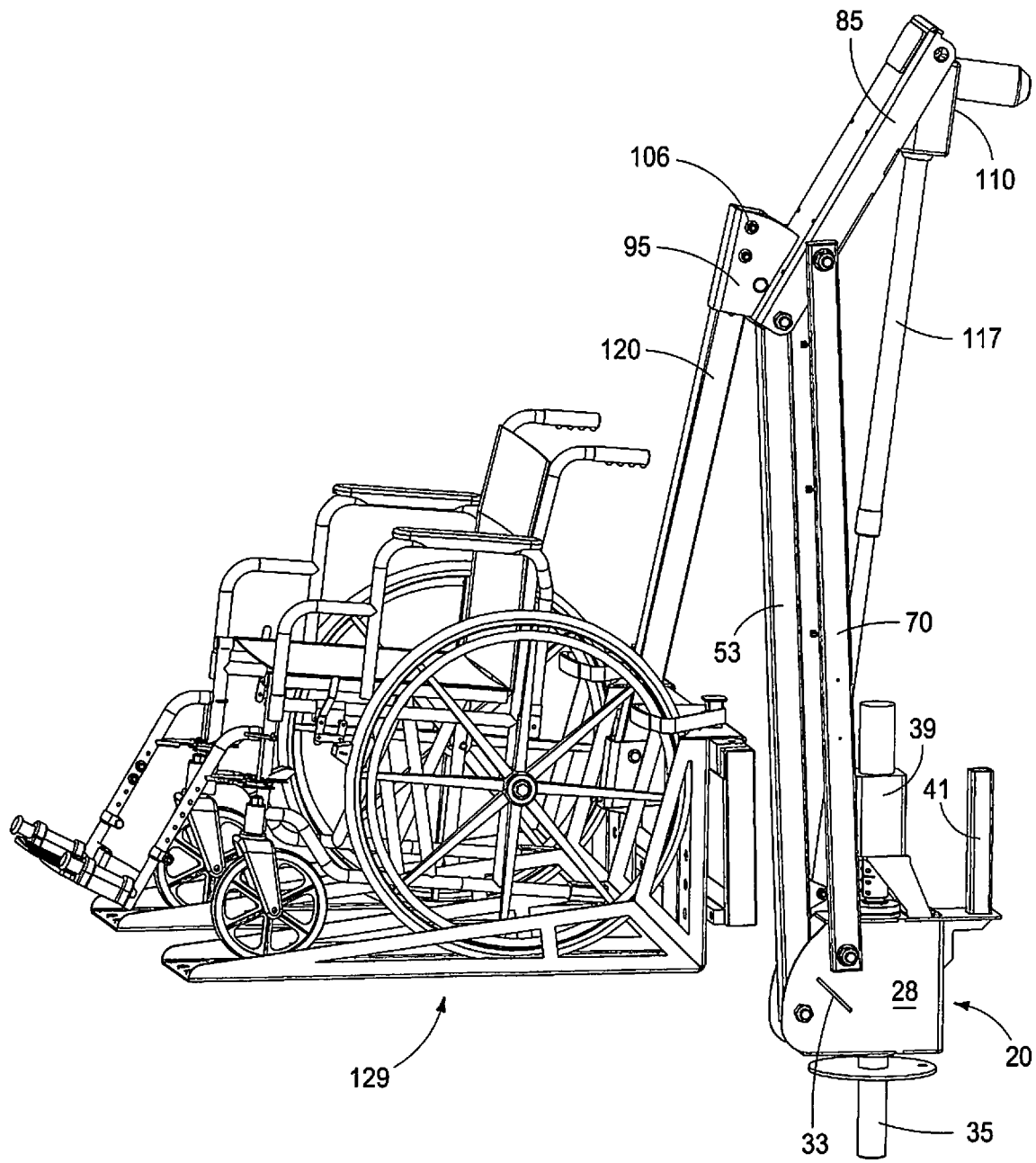
FIG. 9 is an isometric first side, front, and top view of the manipulator arm lift having a load support configured for carriage of a wheelchair.
Figure 10:
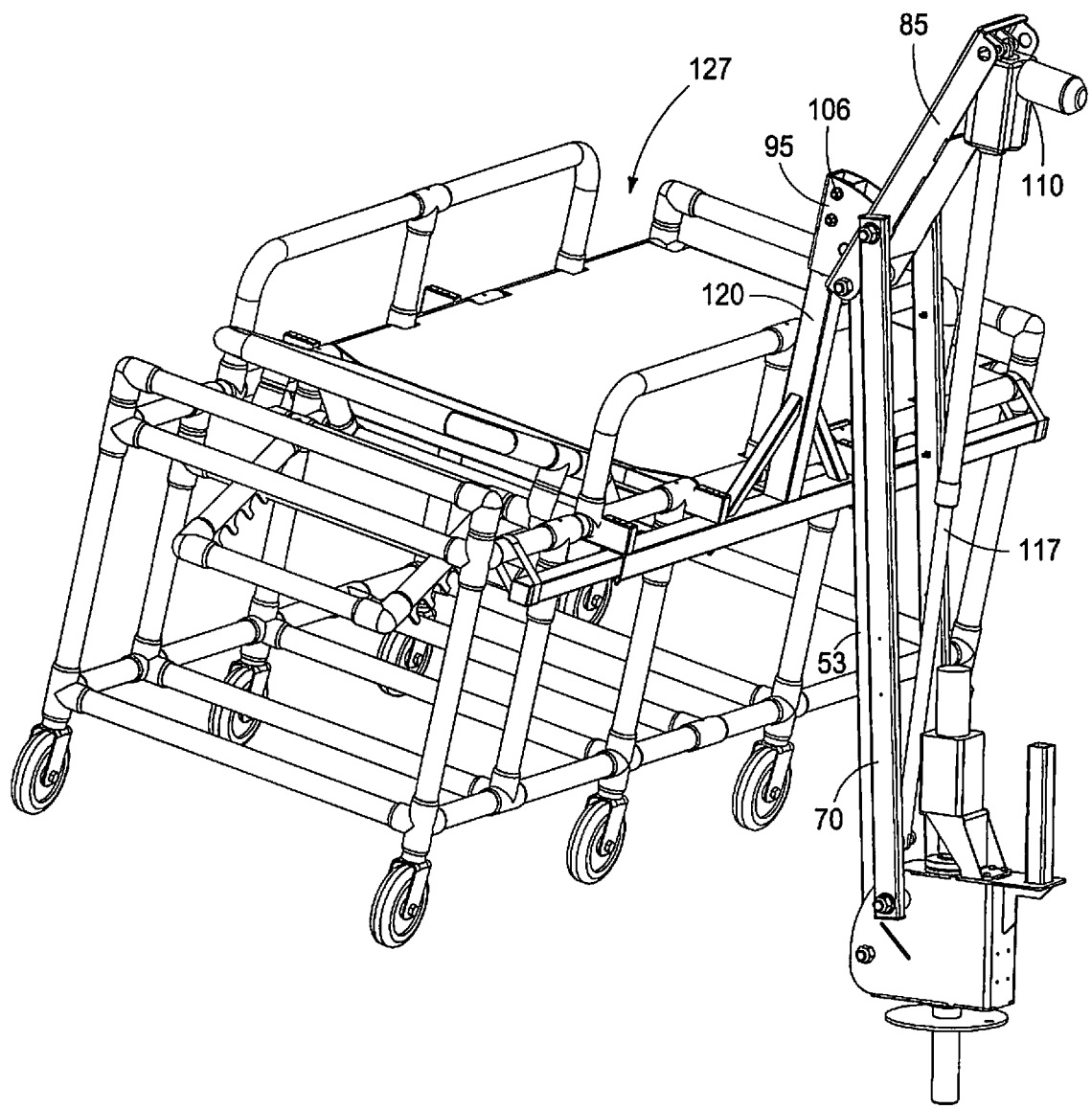
FIG. 10 is an isometric first side, front, and top view of the manipulator arm lift having a load support configured to support a gurney.

A removable load support 125 is carried at the first lower end portion 121 of the second load member 120. The load support 125 may be a chair 126 as shown in FIG. 1, and may also be a sling 128 as shown in FIG. 7, and a stretcher/backboard/spine support 127 as shown in FIG. 8, and a wheelchair support 129 as shown in FIG. 9, and may also be a gurney support 130 as shown in FIG. 10. Although the figures show the load support 125 in various configurations which are for carriage of a human, the instant invention is not limited thereto, and the load support 125 may have other configurations for carriage of other loads, such as, but not limited to forks (not shown) for carriage of a pallet (not shown), graspers (not shown) for grasping cylindrical objects, and the like.

As shown in FIG. 5, a movable carriage 36 may provide the supporting surface 11 so as to provide a movable mechanical manipulator lift 10. The movable carriage 36 has plural spacedly arrayed steerable wheels 38 and extendable outriggers 37 to provide stability. Further, the carriage 36 may carry a contained power source 40 and/or counterbalance weights (not shown) to provide stability to the lift 10.

Further, as best shown in FIG. 5, the base 20 may also carry a drive assembly 39 to provide rotational movement of the lift frame 50 relative to the base 20. The drive assembly 39 operatively communicates with the power source 40, similar to the first linear actuator 110 and the second linear actuator 150 as well as communicating with the operator control 200. The base 20 may also carry a storage strut 41 configured to releasably carry the load support 125 when the lift 10 is not in use and so as to minimize the overall "footprint" of the lift 10.

Operating electronics (not shown) that communicate with the drive assembly 39, the first linear actuator 110, the second linear actuator 150, the operator control 200 and the power source 40 are carried by the lift 10 in an enclosure (not shown) that is moisture proof so as to provide a safety measure, and prevent moisture contamination and possible short-circuiting of the electronics.

Figure 11:
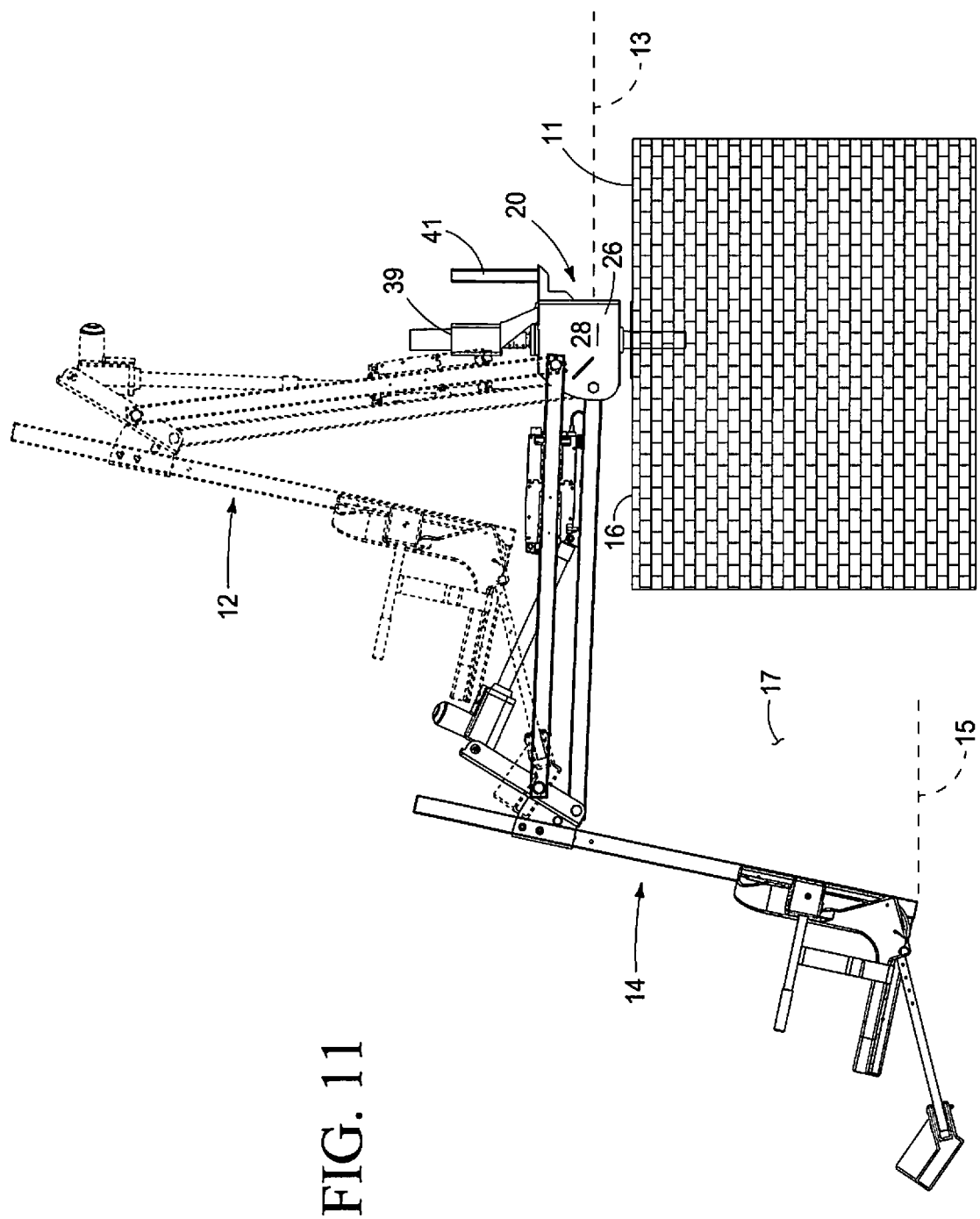
FIG. 11 is an orthographic first side view of the manipulator arm lift mounted on a pool deck and showing the load support in the first position at the first elevation (in dashed outline) and also showing the load support in the second position at the second elevation.
Figure 12:
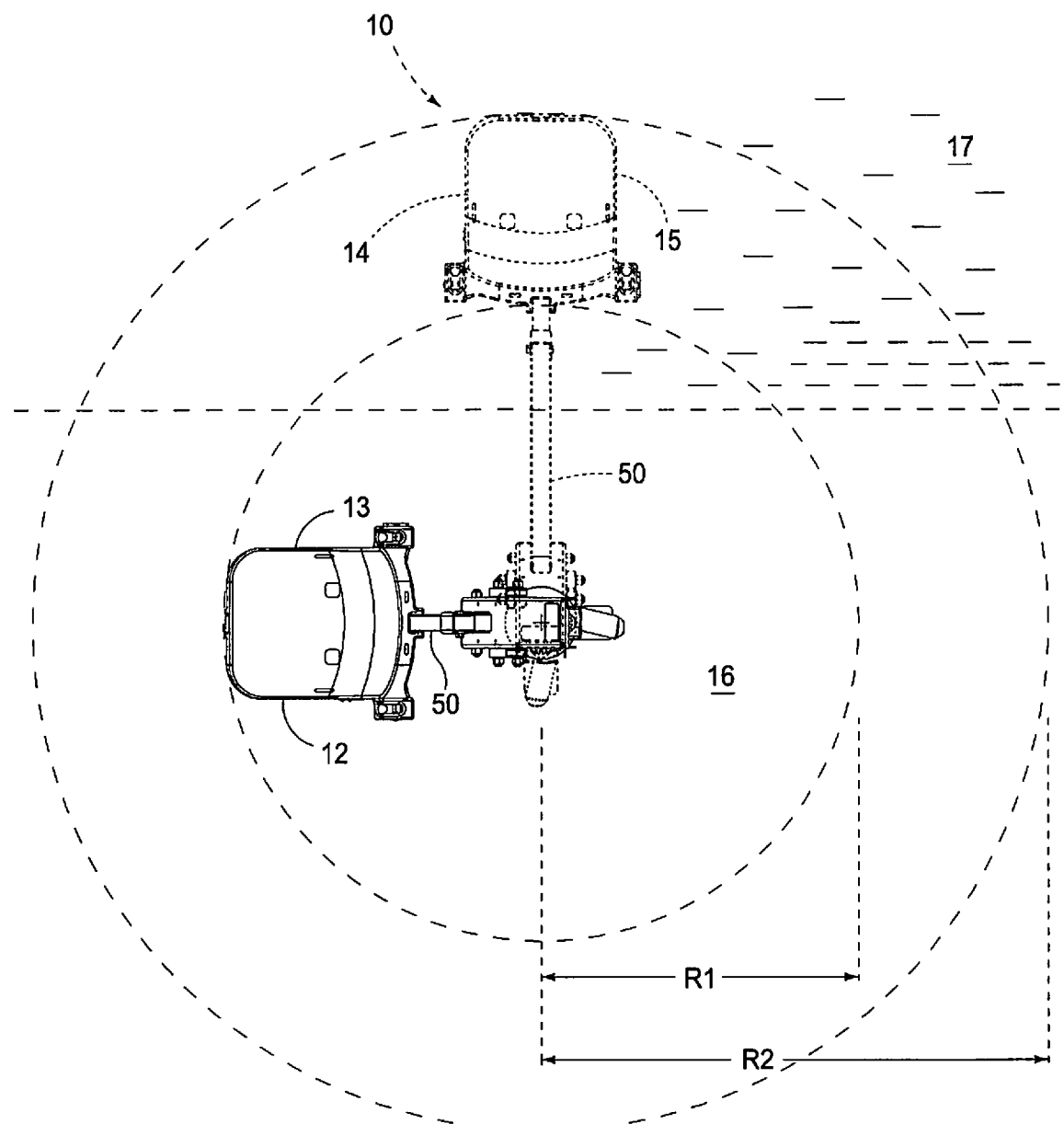
FIG. 12 is a plan view of the manipulator arm lift showing the rotational movement of the manipulator arm lift relative to a vertical axis, and showing the radial reach of the manipulator arm in the first positon and in the second position.

As shown in FIGS. 11 and 12, the instant mechanical manipulator lift 10 is for movement of a load between a first position 12 at a first elevation 13 and a second position 14 at a second elevation 15. In FIG. 11, the first position 12 at the first elevation 13 is shown as a pool deck 16 which is vertically above and spacedly adjacent a pool volume 17 containing water. The second position 14 at the second elevation 15 shows the load support 125 (in this case a chair 126) within the pool volume 17. FIG. 11 illustrates how the first position 12 and first elevation 13 is vertically different from the second position 14 and second elevation 15, and further illustrates how the second position 14 is spaced apart from the base 20 a greater distance, than the first position 12 is spaced apart from the base 20. FIG. 12 is a plan view of the lift 10 showing the rotational movement of the lift 10 between the first position 12 and the second position 14, and also shows the radial distance (R1) between the first position 12 and the second position 14 (R2). The instant mechanical manipulator lift 10 provides vertical movement, lateral translation, and rotational movement to a user. (FIG. 12).

Operation

Having described the structure of the mechanical manipulator lift 10, its operation may be understood.

If the lift 10 is mounted upon a movable carriage 36, the movable carriage 36 is positioned on the supporting surface 11, so that the lift 10 may communicate between the first elevation 13 and the second elevation 15. The outrigger arms 37 are extended as necessary to provide lateral stability, and the wheels 38 are positionally secured with brakes or the like (not shown). The load support 125, (if it is a chair) and if stored upon the storage strut 41 is detached from the storage strut 41 and is attached to the first lower end portion 121 of the second load member 120 with a fastener (not shown). When the load support 125 is interconnected with the second load member 120, the load support 125 is in the first position 12 at the first elevation 13. The lift 10 is operatively interconnected with the power source 40.

The load (perhaps a human and not shown) is placed upon the load support 125 (chair 126, backboard 127, sling 128, gurney 130, wheelchair 129) and is secured upon the load support 125, such as with a seatbelt (not shown) or safety strap (not shown) or other safety connection (not shown).

The operator control 200, which communicates with the power source 40, the drive assembly 39, the first linear actuator 110 and the second linear actuator 150 is positioned so as to be operable by the user upon the load support 125, or by an assistant (not shown) remote from the load support 125.

The operator control 200 is operated so as to direct electrical energy (not shown) to the drive assembly 39 so as to rotate the lift 10 about a vertical axis 203 that extends through the cylindrical mount 35. Rotational movement of the lift 10 facilitates movement of the load from the first position 12 to the second position 14.

The operator control 200 is operated so as to direct electrical energy (not shown) to the first linear actuator 110 which causes the motor 115 to actuate and operate the gear assembly 116 which responsively causes the linear screw shaft 117 to axially rotate. Because the actuator 110 is pivotally interconnected to the fulcrum lever link 85, and pivotally interconnected to the actuator arm yoke 64, axial retraction of the linear screw shaft 117, responsive to axial rotation of the linear screw shaft 117 causes the first load member 53 and the two support members 70 to pivot on axles 62, 78 relative to the base 20, and to simultaneously pivot on axles 63, 79 relative to the fulcrum lever link. Distance 109 between pivot point axle 79, and axle 114 of the fulcrum lever link 85 provides a lever arm, and mechanical advantage to facilitate movement of the lift frame 50. The pivotal movement of the first load member 53 and the two support members 70 changes the configuration of the quadrilateral defined by the first load member 53 and the two support members 70, and responsively causes the load support 125 to move vertically and outwardly relative to the first position 12 and first elevation 13.

Continued axial rotation of the linear screw shaft 117 causes the quadrilateral defined by the four pivot points 62, 63, 78, 79 at the end portions 54, 56 of the first load member 53, and at the end portion 71, 73 of the support members 70 to change from a first configuration (FIG. 1) to a second configuration (FIG. 2) as force is exerted on the second end portion 87 of the fulcrum lever link 85 by the actuator 110. The force causes the lift frame 50 to move between the first position 12 at the first elevation 13 to the second position 14 at the second elevation 15.

If so configured, the operator control 200 is then operated to actuate the second linear actuator 150 so as to actuate motor 156 which responsively operates the gear assembly 157 which axially rotates the second linear screw shaft 117. Because the second linear actuator 150 is pivotally interconnected to the yoke 158, and also to the second load support yoke 159, axial rotation of the second linear screw shaft 117 causes the second load member 120 to move axially relative to the bracket 95 and the medial channel 96 defined thereby. Full axial extension of the second linear screw shaft 117 places the load support 125 at a maximum vertical distance relative to the supporting surface 11, and at the second elevation 15.

When the load support 125 is in the second position 14, and at the second elevation 15, the load carried thereby may be removed from the load support 125.

To move the supported load back to the first elevation 13 and the first position 12, the process set forth above is reversed. It is further to be understood that the operation of the lift 10 may be reversed so that the supported load (not shown) may be placed upon the load support 125 while the lift 10 is in the second position 14 and at the second elevation 15, and then the lift 10 may be actuated/moved to the first position 12 and to the first elevation 13 where the supported load (not shown) is removed from the load support 125.

A mechanical manipulator for moving a load from a first position, at a first elevation, to a second position, at a second elevation, comprising a base having a top, a bottom and defining a base channel between a first side plate and a second side plate, the first side plate and the second side plate are spaced apart from, and parallel to, one another and each side plate defines plural spacedly arrayed axle holes, a mount for securing the base to a supporting surface, and a drive assembly communicating with a power source, to rotate the base relative to the supporting surface; a lift frame pivotally interconnected to the base, the lift frame comprising a first load member, two support members, a fulcrum lever link and an actuator, the first load member has a first lower end portion, a second upper end portion, and a length dimension, and the first lower end portion is pivotally carried within the base channel on an axle journaled by the two base side plates, and the second upper end is pivotally interconnected to the fulcrum lever link with an axle journaled by the fulcrum lever link, and an actuator arm yoke is carried by the first load member proximate to the first lower end portion, and the two support members are parallel, spaced apart, and each has a first end portion, a second end portion and a length dimension therebetween, the first lower end portion of each support member is pivotally interconnected to the base with an axle extending through one of the plural axle holes defined in the base side plate, and the second upper end portion of each support member is pivotally interconnected to the fulcrum lever link with an axle extending through an axle hole defined in the fulcrum lever link, and the fulcrum lever link has a first lower end portion, a second upper end portion, a length dimension therebetween, and defines a U-shaped channel between two spaced apart and parallel side flanges and a transverse wall which has an interior surface within the U-shaped channel, and an exterior surface outside the U-shaped channel, and each side flange defines plural spacedly arrayed axle holes to journal axles which pivotally interconnect the second upper end portions of the two support members, and pivotally interconnect the second upper end portion of the first load member, a bracket for engagement with a second load member is carried on the exterior facing surface of the transverse wall proximate the first lower end portion, and the linear actuator has a second end portion interconnected to the fulcrum lever link at a position proximate the second upper end portion and spaced apart from the first load member interconnection and the two support members interconnection, and a first lower end portion pivotally interconnected to the actuator arm yoke, so that when actuated, the linear actuator moves between a first retracted position, and a second extended position; and a second load member having a first lower end portion, a second upper end portion and a length dimension therebetween and the second load member is interconnected with the bracket carried by the fulcrum lever link, and the first lower end portion of the first load member carries a load support configured for carriage of the load between the first position, at the first elevation, and the second position at the second elevation.

A mechanical manipulator further comprising a second linear actuator operatively communicating between the fulcrum lever link and the second load member to axially extend and axially retract the second load member relative to the fulcrum lever link.

A mechanical manipulator further comprising an operator control operatively communicating with the drive assembly and with the actuator to cause the drive assembly and/or actuator to actuate responsive to operator input.

A mechanical manipulator wherein the drive assembly is an electric motor and a gear assembly.

A mechanical manipulator wherein the actuator is a linear screw actuator.

A mechanical manipulator wherein the load support is configured to support a human.

A mechanical manipulator wherein the load support is a chair.

A mechanical manipulator wherein the load support is generally planar.

A mechanical manipulator wherein the load support is a sling.

A mechanical manipulator of claim 1 and wherein the load is a human.

A mechanical manipulator wherein the base mount attaches to a movable carriage.

A mechanical manipulator wherein the spaced orientation of the plural spacedly arrayed axle holes defined in first and second base side plates determines an arc of travel of the lift frame relative to vertical.

A mechanical manipulator wherein the arc of travel of the lift frame relative to horizontal extends below horizontal.

A mechanical manipulator wherein the fulcrum lever link bracket defines a channel having a longitudinal axis, and the longitudinal axis of the bracket channel is parallel to an axis of the fulcrum lever link U-shaped channel.

A mechanical manipulator wherein the fulcrum lever link bracket defines a channel having a longitudinal axis, and the longitudinal axis of the bracket channel is not parallel to an axis of the fulcrum lever link U-shaped channel.

A mechanical manipulator further comprising a storage strut carried on the base and spaced apart from the base channel, the storage strut configured to provide temporary storage of the load support.

A mechanical manipulator further comprising a power source operatively communicating with the drive assembly, the actuator and the operator control.

A pool lift for moving a load from a first position, at a first elevation, to a second position, at a second elevation, comprising a base having a top portion, a bottom portion, a front portion and a rear portion and defining a base channel between a first, generally planar, vertically oriented side plate and a second, generally planar, vertically oriented side plate, the first side plate and the second side plate are spaced apart from and parallel to one another and each side plate has an exterior facing surface and an opposing inner facing surface and each side plate defines plural spacedly arrayed axle holes to journal axles therein, a strengthening bottom brace and a strengthening rear brace structurally interconnect the first side plate and the second side plate at the inner facing surface of the bottom portion and the inner facing surface of the rear portion, a strengthening gusset structurally carried on the exterior facing surface of each side plate, a mount carried on the bottom portion of the base, for positionally securing the base to a supporting surface, and a drive assembly carried by the base, and communicating with a power source, to rotate the base relative to the supporting surface responsive to an operator input; a lift frame having a first lower end portion pivotally interconnected with the base, and a second upper end portion pivotally interconnected with a fulcrum lever link, the lift frame comprising a first load member, two support members, the fulcrum lever link and an actuator, the first load member has a first lower end portion defining a transversely extending axle hole, a second upper end portion defining a transversely extending axle hole, and a length dimension between the first lower end portion and the second upper end portion, a first exterior surface, a second exterior surface, and two opposing side surfaces, and the first lower end portion of the first load member is pivotally carried within the base channel on an axle extending through the transversely extending axle hole and journaled by the two base side plates so that the first load member is pivotally movable relative to the base, and the second upper end portion of the first load member is pivotally interconnected to the fulcrum lever link by means of an axle extending through the transversely extending axle hole and journaled by the fulcrum lever link, and an actuator arm yoke carried on the second exterior surface of the first load member and proximate to the first lower end portion, and the two parallel, spaced apart, support members are each elongate and each have a first lower end portion defining a transversely extending axle hole and a second upper end portion defining a transversely extending axle hole with a length dimension therebetween, each support member further having a laterally inner side portion and an opposing laterally outer side portion, the first lower end portion of each of the two support members is pivotally interconnected to the base with an axle extending through the transversely extending axle hole defined therein and extending through one of the plural spacedly arrayed axle holes defined in the base side plate, and the second upper end portion of each of the two support members is pivotally interconnected to the fulcrum lever link with an axle extending through the transversely extending axle hole defined therein, and a extending through one of the axle holes defined in the fulcrum lever link side flange, and the laterally inner side portion of each of the two support members, at the first lower end portion, is adjacent the exterior facing surface of a base side plate, and at the second upper end portion thereof, is adjacent an exterior facing surface of the fulcrum lever link, and the fulcrum lever link has a first end portion, a second end portion with a length dimension therebetween, and defines an inverted U-shaped channel between two spaced apart parallel side flanges and a transverse wall, the transverse wall, and each side flange having an interior surface within the inverted U-shaped channel, and an exterior surface, outside the U-shaped channel, and each side flange defines plural spacedly arrayed axle holes, to journal axles which pivotally interconnect the second upper end portions of each of the two support members to the exterior facing surfaces of the side flanges of the fulcrum lever link, and to pivotally interconnect the second upper end portion of the first load member to the fulcrum lever link within the inverted U-shaped channel, a bracket is carried on the exterior facing surface of the transverse wall proximate the first end portion of the fulcrum lever link for engagement with a second load member, and a linear screw actuator having a second end portion interconnected to the second end of the fulcrum lever link within the inverted U-shaped channel with an axle, and spaced apart from both the first load member interconnect ion and the two support members interconnection, and a first lower end portion pivotally interconnected to the actuator arm yoke carried by the first load member, the linear screw actuator further having a motor, communicating with the power source, and a gear assembly so that, when actuated, the motor rotates a linear screw shaft causing the actuator to axially move between a first retracted position and a second extended position; and the second load member has a first lower end portion and a second upper end portion with a length dimension between the first lower end portion and the second upper end portion, the second load member interconnected with the bracket carried on the exterior surface of the fulcrum lever link, and the first lower end portion of the second load member carries a load support configured for carriage of a load, and responsive to operator actuation of the actuator, and the base drive assembly, the load support is movable, while carrying the load, between the first position, at the first elevation on a swimming pool deck, and the second position at the second elevation within a body of water within a swimming pool volume.

A manipulator arm for moving a load from a first position at a first elevation to a second position at a second elevation comprising a base plate having a mount on a bottom surface to engage with the supporting surface, and the base plate defines two spaced apart axle holes; a fulcrum lever link having a transverse wall and two spaced apart and parallel side flanges, each side flange structurally interconnected to the transverse wall along adjacent edge portions thereof, the fulcrum lever link having a first end portion, a second and portion and defining to spaced apart axle holes in each side flange; an elongate first load member having a first end portion and a spaced apart second and portion, each end portion of the first load member defining a transversely extending axle hole to carry an axle extending therethrough; an elongate support member having a first end portion and a spaced apart second end portion, each end portion of the elongate support member defining a transversely extending axle hole to carry an axle extending therethrough; two of the plural spacedly arrayed axle holes defined in the base side plate, and two of the spacedly arrayed holes defined in the side flanges of the fulcrum lever link define pivot points for a quadrilateral formed by the first load member and the support member, and the quadrilateral has a first configuration in the first position and has a second configuration in the second position, and changing the quadrilateral configuration from the first configuration to the second configuration is accomplished by exerting a force on the fulcrum lever link second and portion that is spaced apart from the two spacedly arrayed holes defined in the side flanges.

Having described our mechanical manipulator lift for moving a load from a first position at a first elevation, to a second position at a second elevation we respectfully pray issuance of utility letters patent.

We claim:

1. A mechanical manipulator for moving a load from a first position, at a first elevation, to a second position, at a second elevation, comprising:
   a base having
      a top, a bottom and defining a base channel between a first side plate and a second side plate,
      the first side plate and the second side plate are spaced apart from, and parallel to, one another and each side plate defines plural spacedly arrayed axle holes,
      a mount for securing the base to a supporting surface, and
      a drive assembly communicating with a power source, to rotate the base relative to the supporting surface;
   a lift frame pivotally interconnected to the base, the lift frame comprising a first load member, two support members, a fulcrum lever link and an actuator,
      the first load member has a first lower end portion, a second upper end portion, and a length dimension, and the first lower end portion is pivotally carried within the base channel on an axle journaled by the two base side plates, and the second upper end is pivotally interconnected to the fulcrum lever link with an axle journaled by the fulcrum lever link, and an actuator arm yoke is carried by the first load member proximate to the first lower end portion, and
      the two support members are parallel, spaced apart, and each has a first end portion, a second end portion and a length dimension therebetween,
      the first lower end portion of each support member is pivotally interconnected to the base with an axle extending through one of the plural axle holes defined in the base side plate, and the second upper end portion of each support member is pivotally interconnected to the fulcrum lever link with an axle extending through an axle hole defined in the fulcrum lever link, and the fulcrum lever link has a first lower end portion, a second upper end portion, a length dimension therebetween, and defines a U-shaped channel between two spaced apart and parallel side flanges and a transverse wall which has an interior surface within the U-shaped channel, and an exterior surface outside the U-shaped channel, and each side flange defines plural spacedly arrayed axle holes to journal axles which pivotally interconnect the second upper end portions of the two support members, and pivotally interconnect the second upper end portion of the first load member, a bracket for engagement with a second load member is carried on the exterior facing surface of the transverse wall proximate the first lower end portion, and the actuator has a second end portion interconnected to the fulcrum lever link at a position proximate the second upper end portion and spaced apart from the first load member interconnection and the two support members interconnection, and a first lower end portion pivotally interconnected to the actuator arm yoke, so that when actuated, the actuator moves between a first retracted position, and a second extended position; and a second load member having a first lower end portion, a second upper end portion and a length dimension therebetween and the second load member is interconnected with the bracket carried by the fulcrum lever link, and the first lower end portion of the first load member carries a load support configured for carriage of the load between the first position, at the first elevation, and the second position at the second elevation.

2. The mechanical manipulator of claim 1 and further comprising:
a second linear actuator operatively communicating between the fulcrum lever link and the second load member to axially extend and axially retract the second load member relative to the fulcrum lever link.

3. The mechanical manipulator of claim 1 and further comprising:
an operator control operatively communicating with the drive assembly and with the actuator to cause the drive assembly and/or actuator to actuate responsive to operator input.

4. The mechanical manipulator of claim 1 and wherein the drive assembly is an electric motor and a gear assembly.

5. The mechanical manipulator of claim 1 and wherein the actuator is a linear screw actuator.

6. The mechanical manipulator of claim 1 and wherein the load support is configured to support a human.

7. The mechanical manipulator of claim 1 and wherein the load support is a chair.

8. The mechanical manipulator of claim 1 and wherein the load support is generally planar.

9. The mechanical manipulator of claim 1 and wherein the load support is a sling.

10. The mechanical manipulator of claim 1 and wherein the load is a human.

11. The mechanical manipulator of claim 1 and wherein the base mount attaches to a movable carriage.

12. The mechanical manipulator of claim 1 and wherein the spaced orientation of the plural spacedly arrayed axle holes defined in first and second base side plates determines an arc of travel of the lift frame relative to vertical.

13. The mechanical manipulator of claim 1 and wherein the arc of travel of the lift frame relative to horizontal extends below horizontal.

14. The mechanical manipulator of claim 1 and wherein the fulcrum lever link bracket defines a channel having a longitudinal axis, and the longitudinal axis of the bracket channel is parallel to an axis of the fulcrum lever link U-shaped channel.

15. The mechanical manipulator of claim 1 and wherein the fulcrum lever link bracket defines a channel having a longitudinal axis, and the longitudinal axis of the bracket channel is not parallel to an axis of the fulcrum lever link U-shaped channel.

16. The mechanical manipulator of claim 1 and further comprising:
a storage strut carried on the base and spaced apart from the base channel, the storage strut configured to provide temporary storage of the load support.

17. The mechanical manipulator of claim 1 and further comprising:
a power source operatively communicating with the drive assembly, the actuator and the operator control.

18. A pool lift for moving a load from a first position, at a first elevation, to a second position, at a second elevation, comprising:
a base having a top portion, a bottom portion, a front portion and a rear portion and defining a base channel between a first, generally planar, vertically oriented side plate and a second, generally planar, vertically oriented side plate,
the first side plate and the second side plate are spaced apart from and parallel to one another and each side plate has an exterior facing surface and an opposing inner facing surface and each side plate defines plural spacedly arrayed axle holes to journal axles therein,
a strengthening bottom brace and a strengthening rear brace structurally interconnect the first side plate and the second side plate at the inner facing surface of the bottom portion and the inner facing surface of the rear portion,
a strengthening gusset structurally carried on the exterior facing surface of each side plate,
a mount carried on the bottom portion of the base, for positionally securing the base to a supporting surface, and
a drive assembly carried by the base, and communicating with a power source, to rotate the base relative to the supporting surface responsive to an operator input;
a lift frame having a first lower end portion pivotally interconnected with the base, and a second upper end portion pivotally interconnected with a fulcrum lever link, the lift frame comprising a first load member, two support members, the fulcrum lever link and an actuator,
the first load member has a first lower end portion defining a transversely extending axle hole, a second upper end portion defining a transversely extending axle hole, and a length dimension between the first lower end portion and the second upper end portion, a first exterior surface, a second exterior surface, and two opposing side surfaces, and the first lower end portion of the first load member is pivotally carried within the base channel on an axle extending through the transversely extending axle hole and journaled by the two base side plates so that the first load member is pivotally movable relative to the base, and the second upper end portion of the first load member is pivotally interconnected to the fulcrum lever link by means of an axle extending through the transversely extending axle hole and journaled by the fulcrum lever link, and an actuator arm yoke carried on the second exterior surface of the first load member and proximate to the first lower end portion, and the two parallel, spaced apart, support members are each elongate and each have a first lower end portion defining a transversely extending axle hole and a second upper end portion defining a transversely extending axle hole with a length dimension therebetween, each support member further having a laterally inner side portion and an opposing laterally outer side portion, the first lower end portion of each of the two support members is pivotally interconnected to the base with an axle extending through the transversely extending axle hole defined therein and extending through one of the plural spacedly arrayed axle holes defined in the base side plate, and the second upper end portion of each of the two support members is pivotally interconnected to the fulcrum lever link with an axle extending through the transversely extending axle hole defined therein, and extending through one of the axle holes defined in the fulcrum lever link side flange, and the laterally inner side portion of each of the two support members, at the first lower end portion, is adjacent the exterior facing surface of a base side plate, and at the second upper end portion thereof, is adjacent an exterior facing surface of the fulcrum lever link, and the fulcrum lever link has a first end portion, a second end portion with a length dimension therebetween, and defines an inverted U-shaped channel between two spaced apart parallel side flanges and a transverse wall, the transverse wall, and each side flange having an interior surface within the inverted U-shaped channel, and an exterior surface, outside the U-shaped channel, and each side flange defines plural spacedly arrayed axle holes, to journal axles which pivotally interconnect the second upper end portions of each of the two support members to the exterior facing surfaces of the side flanges of the fulcrum lever link, and to pivotally interconnect the second upper end portion of the first load member to the fulcrum lever link within the inverted U-shaped channel, a bracket is carried on the exterior facing surface of the transverse wall proximate the first end portion of the fulcrum lever link for engagement with a second load member, and the actuator has a second end portion interconnected to the second end of the fulcrum lever link within the inverted U-shaped channel with an axle, and spaced apart from both the first load member interconnection and the two support members interconnection, and a first lower end portion pivotally interconnected to the actuator arm yoke carried by the first load member, the actuator further has a motor, communicating with the power source, and a gear assembly so that, when actuated, the motor rotates a linear screw shaft causing the actuator to axially move between a first retracted position and a second extended position; and the second load member has a first lower end portion and a second upper end portion with a length dimension between the first lower end portion and the second upper end portion, the second load member interconnected with the bracket carried on the exterior surface of the fulcrum lever link, and the first lower end portion of the second load member carries a load support configured for carriage of a load, and responsive to operator actuation of the actuator, and the base drive assembly, the load support is movable, while carrying the load, between the first position, at the first elevation on a swimming pool deck, and the second position at the second elevation within a body of water within a swimming pool volume.

* * * * *